(12) United States Patent
Garthwaite et al.

(10) Patent No.: US 7,136,887 B2
(45) Date of Patent: Nov. 14, 2006

(54) METHOD AND MECHANISM FOR FINDING REFERENCES IN A CARD IN TIME LINEAR IN THE SIZE OF THE CARD IN A GARBAGE-COLLECTED HEAP

(75) Inventors: Alexander T. Garthwaite, Beverly, MA (US); David L. Detlefs, Westford, MA (US); Antonios Printezis, Woburn, MA (US); Y. Srinivas Ramakrishna, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 468 days.

(21) Appl. No.: 10/309,503

(22) Filed: Dec. 4, 2002

(65) Prior Publication Data

US 2004/0111445 A1 Jun. 10, 2004

(51) Int. Cl.
*G06F 12/12* (2006.01)
(52) U.S. Cl. .................................... 707/206
(58) Field of Classification Search ............... 707/206, 707/5, 103 R, 103 X, 103 Y, 102, 103 Z, 707/205; 718/104, 1; 711/159
See application file for complete search history.

(56) References Cited

U.S. PATENT DOCUMENTS 6,148,310 A * 11/2000 Azagury et al. ............ 707/206
6,243,720 B1 * 6/2001 Munter et al. ............. 707/206
6,457,019 B1 * 9/2002 Sexton et al. ........... 707/103 R

OTHER PUBLICATIONS

Jones and Lins, "Garbage Collection: Algorithms for Automatic Dynamic Memory Management," 1996, pp. 165-179, Wiley, New York.
Paul Wilson, "Uniprocessor Garbage Collection Techniques," Technical Report, University of Texas, 1994, 67 pages.
Hudson and Moss, "Incremental Collection of Mature Objects," Proceedings of International Workshop on Memory Management, 1992, Springer-Verlag, 16 pages.
Grarup and Seligmann, "Incremental Mature Garbage Collection," M.Sc. Thesis, Available at http://www.daimi.au.dk/~jacobse/Papers/, no date 198 pages.
Seligmann and Grarup, "Incremental Mature Garbage Collection Using the Train Algorithm," Proceedings of ECOOP '95, Ninth European Conference on Object-Oriented Programming, 1995, http://www.daimi.au.dk/~jacobse/Papers/, 18 pages.

(Continued)

*Primary Examiner*—Paul L. Rodriguez
*Assistant Examiner*—Luke Osborne
(74) *Attorney, Agent, or Firm*—Kudirka & Jobse, LLP

(57) ABSTRACT

A garbage collector divides the garbage-collected heap into "cards." It maintains a table containing a card-object table entry for each card. A card's entry contains information from which the collector can determine where any references in the card are located and thereby identify objects that may be reachable. The encoding of a card's table entry is not restricted to values that indicate the location of the object in which the card begins. Instead, its possible values additionally include ones that indicate that the card begins with a certain number of references or that an object begins at a given location in the middle of the card. The collector thereby avoids consulting object's class information unnecessarily.

37 Claims, 20 Drawing Sheets

OTHER PUBLICATIONS

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, Apr. 4, 1978, pp. 280-294.

Appel, Ellis, and Li, "Real-time Concurrent Collection on Stock Multiprocessors," ACM SIGPLAN Notices, 1988, 24 pages.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001, 12 pages.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada, 15 pages.

Lam, Wilson, and Hoher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998, 12 pages.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul., 5 pages.

Hudson and Hosking, "Remembered sets can also play cards," in OOPSLA/ECOOP Workshop on Garbage Collection in Object-Oriented Systems, Oct. 1993, Edited by Moss, Wilson, and Zorn, 8 pages.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988, 70 pages.

* cited by examiner

METHOD AND MECHANISM FOR FINDING REFERENCES IN A CARD IN TIME LINEAR IN THE SIZE OF THE CARD IN A GARBAGE-COLLECTED HEAP

CROSS-REFERENCE TO RELATED APPLICATIONS

The present application is related to commonly owned co-pending U.S. patent application Ser. No. 10/309,909 of Alexander T. Garthwaite for Combining Entries in a Card Object Table, which was filed on the same date as this application and was assigned Cesari and McKenna.

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 is depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

Note that the operation of locating reachable objects requires that the collector be able to identify which of an object's fields contain references. In most object-oriented systems, the collector is able to do this by referring to information about the object's class. As FIG. 5 illustrates, a typical object 54 includes a field 56 that tells where to find information about the class to which the object belongs. For the sake of example, that drawing depicts the class information as being spread about among a number of separately located data structures. The object's class-pointer field 56 points to one of those structures, a "near-class" structure 58, which contains some of the class information that is accessed most frequently. That structure could contain a reference map, i.e., a description of where in that class's object format its references are located. But the drawing instead depicts the near-class structure as containing a pointer 60 to a separate reference-map structure 62. For the sake of simplicity, that structure is depicted simply as a list 64 of offsets, which indicate where in the object format respective references reside, and terminal field 66, by which the end of the map can be recognized. More typically, a reference map would include more information, such as the references' types.

A class's data structures also include format information, from which the collector can determine where an object of that class ends and the next one begins. But all of this presupposes knowledge of where at least one object started in the first place. The operation of obtaining that information is potentially quite expensive in nearly all collectors. To illustrate how the need for it arises, though, we describe one particular type of garbage collector as an example.

One of the features of the example type of collector is that it relocates reachable objects in order to avoid excessive heap fragmentation. FIG. 6 shows a typical approach. The heap is partitioned into two halves, hereafter called "semi-spaces." For one garbage-collection cycle, all objects are allocated in one semi-space 68, leaving the other semi-space 70 free. When the garbage-collection cycle occurs, objects identified as reachable are "evacuated" to the other semi-space 70, so all of semi-space 68 is then considered free. Once the garbage-collection cycle has occurred, all new objects are allocated in the lower semi-space 70 until yet another garbage-collection cycle occurs, at which time the reachable objects are evacuated back to the upper semi-space 68.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older "old" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 7, which depicts a heap as organized into three generations 72, 74, and 76. Assume that generation 74 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 72 and 76, which themselves may contain references to objects in generation 74. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 7 depicts the various generations as being divided into smaller sections, known for this purpose as "cards." Card tables 78, 80, and 82 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 7 shows three, most generational garbage collectors have only two generations, of which one is the young generation and the other is the old generation. Moreover, although FIG. 7 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the old one less frequently.

Some collectors collect the entire young generation in every interval and may thereafter perform old-generation collection in the same interval. It may therefore take relatively little time to scan all young-generation objects remaining after young-generation collection to find references into the old generation. Even when such collectors do use card tables, therefore, they often do not use them for finding young-generation references that refer to old-generation objects. On the other hand, laboriously scanning the entire old generation for references to young-generation (or old-generation) objects would ordinarily take too long, so the collector uses the card table to limit the amount of memory it searches for old-generation references.

Now, although it typically takes very little time to collect the young generation, it may take more time than is acceptable within a single garbage-collection cycle to collect the entire old generation. So some garbage collectors may collect the old generation incrementally; that is, they may perform only a part of the old generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 8 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which conventionally are ordered according to age. For example, FIG. 8 shows an oldest train 86 consisting of a generation 88's three car sections described by associated data structures 90, 91, and 92, while a second train 93 consists only of a single car section, represented by structure 94, and the youngest train 95 (referred to as the "allocation train") consists of car sections that data structures 96 and 97 represent. Car sections' train memberships can change, and any car section added to a train is typically added to the end of a train.

Conventionally, the car collected in an increment is the one added earliest to the oldest train, which in this case is car 90. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 90's remembered set 98, lists locations in the generation that contain references into the associated car section.

The remembered sets for all of a generation's cars are typically updated at the start of each collection cycle. To illustrate how such updating and other collection operations may be carried out, FIGS. 9A and 9B (together, "FIG. 9") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 9 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 9 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 9 is intended to illustrate such an occasion.

When the collector's interval first starts, it first processes the card table, in an operation that block 104 represents. As was mentioned above, the collector scans the "dirtied" cards for references into the young generation. If a reference is found, that fact is recorded appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is with-held from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage data structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage data structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 9B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 10 illustrates how the processing represented by block 114 proceeds. The entries identify heap regions, and, as block 116 indicates, the collector scans the thus-identified heap regions to find references to locations in the collection set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 11 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 12A and 12B (together, "FIG. 12") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 12, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 11 illustrates, though, the processing of a given evacuated object's references occurs before the next object is evacuated. So FIG. 12's blocks 134 and 148 indicate that the FIG. 12 operation is completed when all of the references contained in the evacuated object have been processed. This completes FIG. 11's object-evacuation operation, which FIG. 10's block 124 represents.

As FIG. 10 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 9's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

As is apparent from the discussion so far, much of the operation of a garbage collector involves following references to find reachable objects. In most cases, the search begins with a reference: a reference in the basic root set, say, is followed to the referred-to object, the information in the class information referred to by the object's class field is used to locate any references in the object, and those references are similarly followed to find further referred-to objects.

But it sometimes occurs that an operation begins not with the location of a reference or an object but with that of a region in which a reference or other object field needs to be located. An example arises, for example, in the operation represented by FIG. 9A's block 104. In that operation, the mutator has notified the collector that certain cards contain modified references, and the collector needs to determine what objects are referred to by references located in those cards so that it can record those references' locations in remembered sets associated with the referred-to objects' car sections. But it starts out with a region identifier, not with specific reference locations, so it must somehow determine one from the other. It can be appreciated that this type of situation arises in many types of collectors, not just in those that, as the above example does, employ the train algorithm.

This need for object-field-from-region operations arises in other garbage-collection situations, too. For example, consider parallel collection, in which different collector threads (typically running on separate processors) are performing evacuation concurrently. The different threads will usually be assigned respective regions to scan. To scan their regions without scanning the same object, they need to identify the boundaries of objects that straddle the dividing lines between regions; they need to locate the object fields that a region contains.

Another example arises in concurrent collection, in which a collector does most of its work concurrently with mutator operation, as was explained above. As was also mentioned above, such systems usually still interrupt mutator operation briefly for an operation in which reachable-object marking is completed. In such marking, regions identified as having been modified are scanned, as was described above, but the scanning can be limited to objects within the dirty regions that have already been marked reachable. To identify the references in such objects, the object locations have to be determined.

So the task of finding object fields within known regions arises in many garbage-collection situations. A typical way to make this possible involves dividing the heap into regions with which the collector associates respective sets of locator information. In a collector that employs a card table to keep track of heap modifications, the regions used for this purpose are typically the same as those used for card-table purposes, so we will refer to them too, as cards, although such regions do not have to be the same as the cards with which card-table entries are associated. We will refer to the set of locator information as a card object table, although the information is not necessarily stored in a format that would ordinarily be considered a table—and, again, need not be given in terms of the regions used for write-barrier output. FIG. 13 illustrates this conceptually: it shows a card-object table 170, 172, or 174 for each respective generation, each table including an entry, such as entry 176, for each card in the respective generation.

When the mutator calls for space to be allocated dynamically to a new object, the card-object table receives one or more entries from which the collector can deduce the locations of references in that object. Perhaps the simplest approach that has been employed for this purpose is to have the card-object-table entry indicate whether the associated card begins with an object.

In this approach, when an object is allocated at the beginning of a card, the corresponding entry in the card object table is marked to reflect that. Later, when the collector needs to scan the card for references, it can infer from that entry where the first object's class information is and thereby determine where its member references are. Since the collector will thereby also be able to determine where the object ends, it can further determine where the next object begins. (Relocating collectors typically locate objects compactly, so the next object will begin at the next location at which alignment rules permit an object to begin. In non-relocating collectors, a free block may be located next, but it can be treated as an object for this purpose: it will typically have a "type" field identifying it as a free block and include information indicating how long it is.)

On the other hand, if the card-object-table entry for a given card in this scheme does not indicate that an object starts at the beginning of the card, a collector scanning for references has to work backward through the card-object table until it finds one that does. It then starts at that card and works forward through each object, using information obtainable through respective objects' class-pointer fields to determine where the objects end, until it reaches the object that extends into the card of interest. At that point, it will use the class information for that object and possibly subsequent ones to locate the references in the card of interest.

Although updating the card object table is simple in this approach, the operation of locating references can be quite time-consuming. The collector may need to traverse a considerable number of card-object-table entries before it finds a card at whose starting location an object begins. And it may thereafter need to consult the class information for a large number of objects before it reaches the objects of interest.

To reduce the cost of locating references, some collectors use a different approach, one that is based on the recognition that a card usually starts in the middle of an object. In one implementation, for example, each entry is two bytes and treated as a signed integer. If its value is negative, the entry tells how many bytes (or words, double words, etc., depending on object alignment) in front of the card the object begins. (Unless stated otherwise, a word as used below will mean four bytes, i.e., enough to hold an address in a system that employs thirty-two-bit addressing, while a double word will mean eight bytes, i.e., enough to hold an address in a system that employs sixty-four-bit addressing.) Since some objects are so large that a two-byte entry is not big enough to indicate where the object starts, though, a positive value is interpreted as directing that the collector skip forward a number of card-object-table entries that is equal to the current entry's value and to look there for the needed information.

Clearly, this approach tends to make the operation of finding references much less costly than it can be when card-object-table entries indicate only whether an object starts at the card's starting address.

SUMMARY OF THE INVENTION

But we have developed a way of making the operation of locating references still more efficient. We take advantage of the fact that in many cases the ultimate purpose is to locate references and that this does not always require locating the start of the object in which the card begins. According to the invention, therefore, some of the possible entry values deal with information other than the location of that first object.

For example, some possible entry values may indicate that the card starts with respective numbers of references. Another possible value may indicate that the card contains no references. Certain other values may, as in the prior art, represent offsets that indicate the address at which an object starts, but that position may be behind the start of the card rather than in front of it. As will be seen below, using such values can save considerable time that would otherwise be expended in consulting objects' class information.

BRIEF DESCRIPTION OF THE DRAWINGS

The invention description below refers to the accompanying drawings, of which.

DETAILED DESCRIPTION OF AN ILLUSTRATIVE EMBODIMENT

According to the present invention, the information encoded in a card object table's entries is not restricted to locating the start of the object in which the card begins. As will be seen, most embodiments will interpret some values as indicating directly where some references are.

Now, one might think that such an approach would impose too much memory overhead. For example, consider a card size of 512 bytes in a 32-bit system that imposes word (four-byte) alignment on its references. Since there are 128 possible reference locations in a card, there are $2^{218}$ possible reference-location combinations. This would take thirty-two bytes to encode: the overhead imposed by the need to locate references would be over 6% of the memory ranges covered rather than a few tenths of a percent. As the examples below will show, though, a code that specifies reference locations in many of the most common patterns can be much less expensive.

The invention can be used in computer systems that use thirty-two-bit, sixty-four-bit, or any other word size. And it can employ any card size. For the sake of concreteness, though, the example encoding schemes described below are all intended for use in a thirty-two-bit system in which the card size is 512 bytes. The first example is intended for an arrangement in which objects are single-word aligned, i.e., in which the last two bits of each object's address are $00_2$. In this example, each card-object-table entry consists of two bytes, which are interpreted as a signed integer. If the entry's value is negative, the collector interprets it, as some prior-art approaches do, as an offset to the object's location. Also as in some prior-art approaches, the address at the object location used for this purpose is the address at which the object starts, although not all embodiments of the invention will specify object location in that manner. But the object whose starting location is thereby identified is not necessarily the one in which the associated card starts. Specifically, a negative value is interpreted as representing the number of (in a thirty-two-bit system, four-byte) words between the (word-aligned) end of the card and the start of the object of interest. So these values can represent object starting locations within the card, not just the starting locations of objects in which the card begins.

Figure 1:
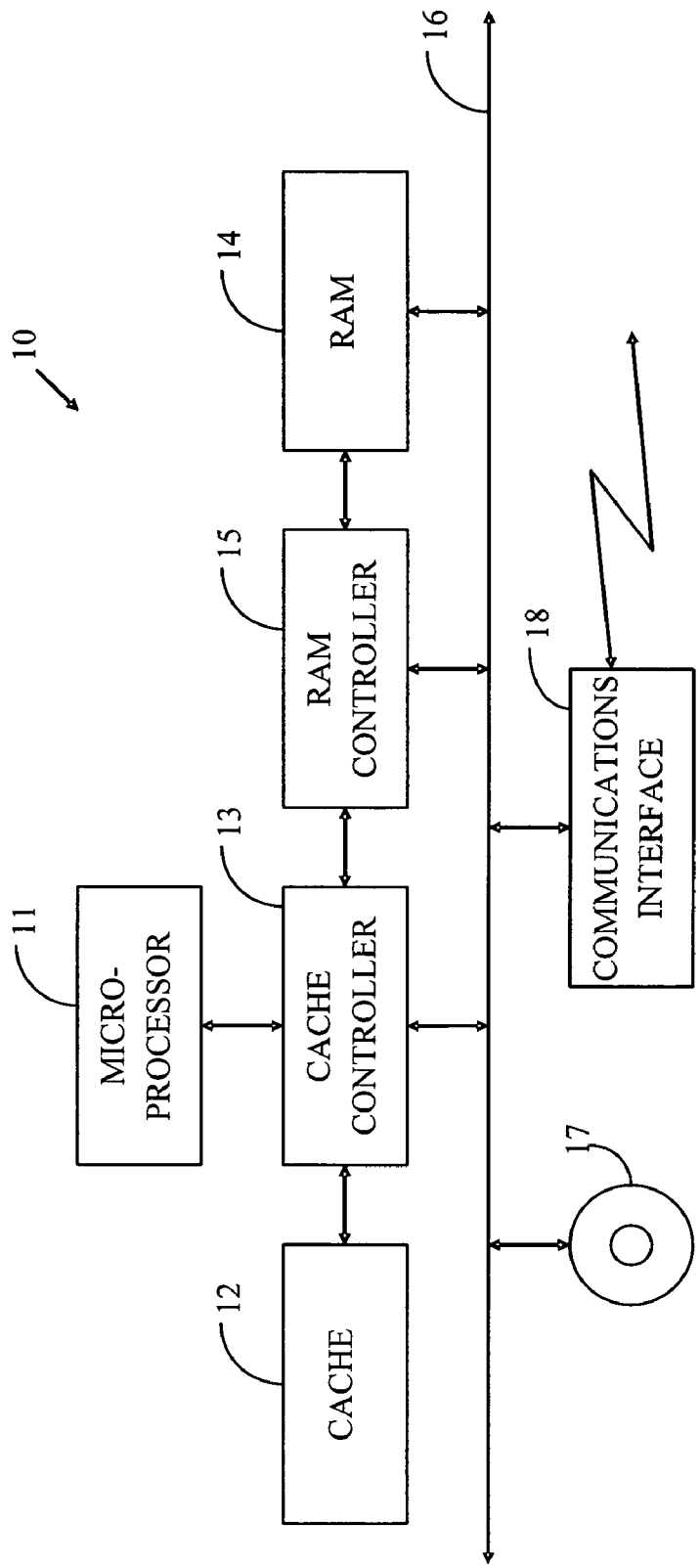
FIG. 1, discussed above, is a block diagram of a computer system in which the present invention's teachings can be practiced.
Figure 2:
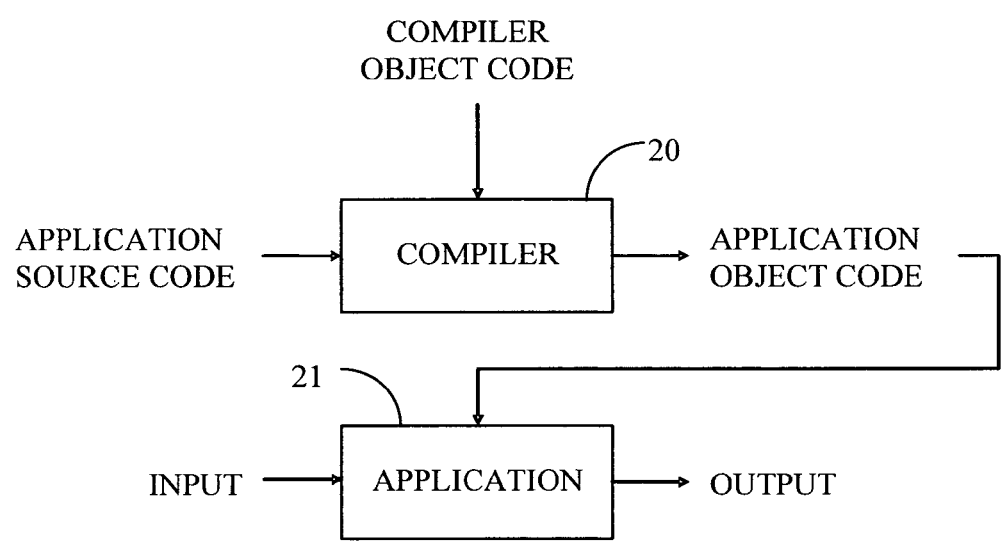
FIG. 2 as, discussed above, is a block diagram that illustrates a compiler's basic functions.
Figure 3:
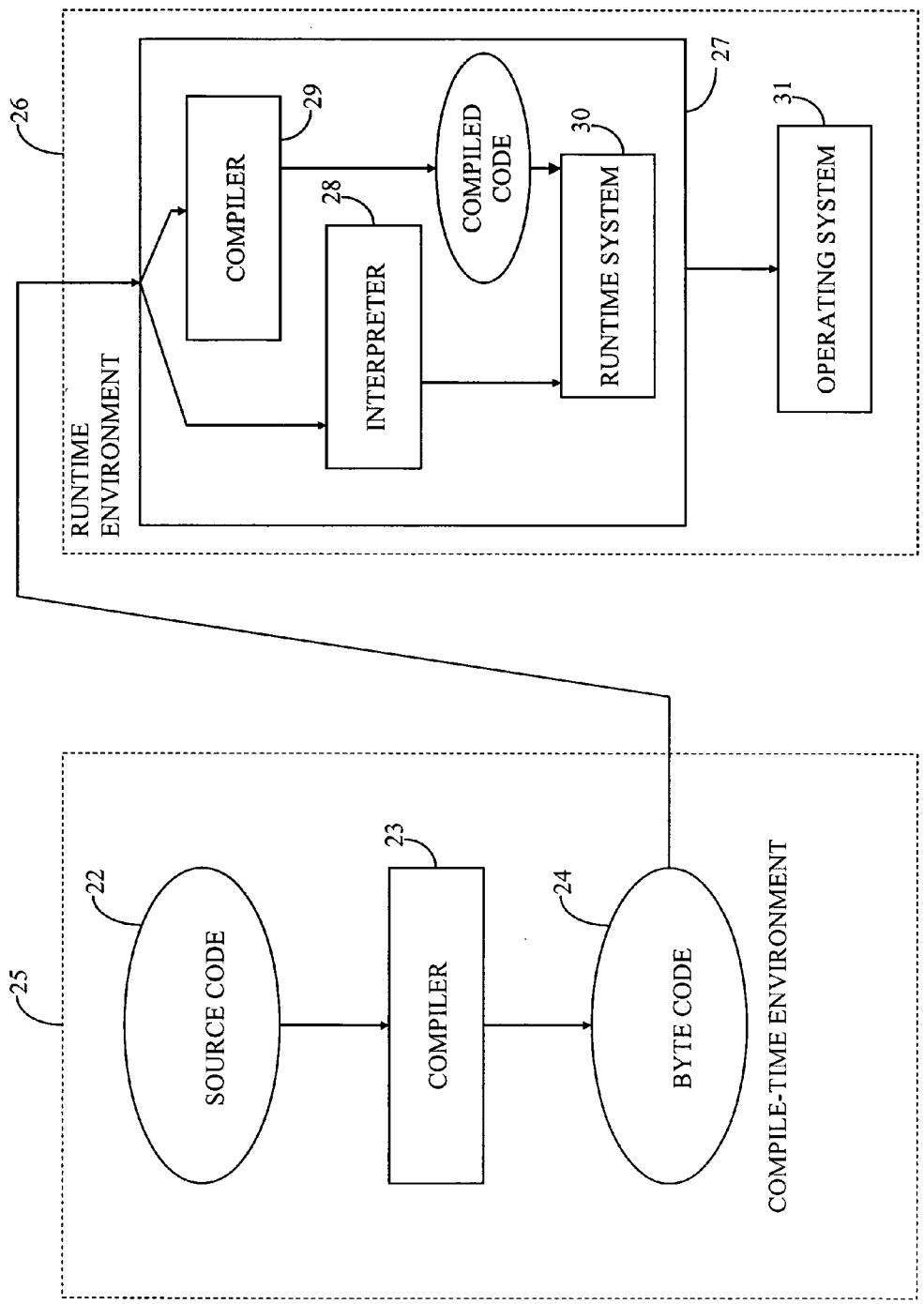
FIG. 3, discussed above, is a block diagram that illustrates a more-complicated compiler/interpreter organization.
Figure 4:
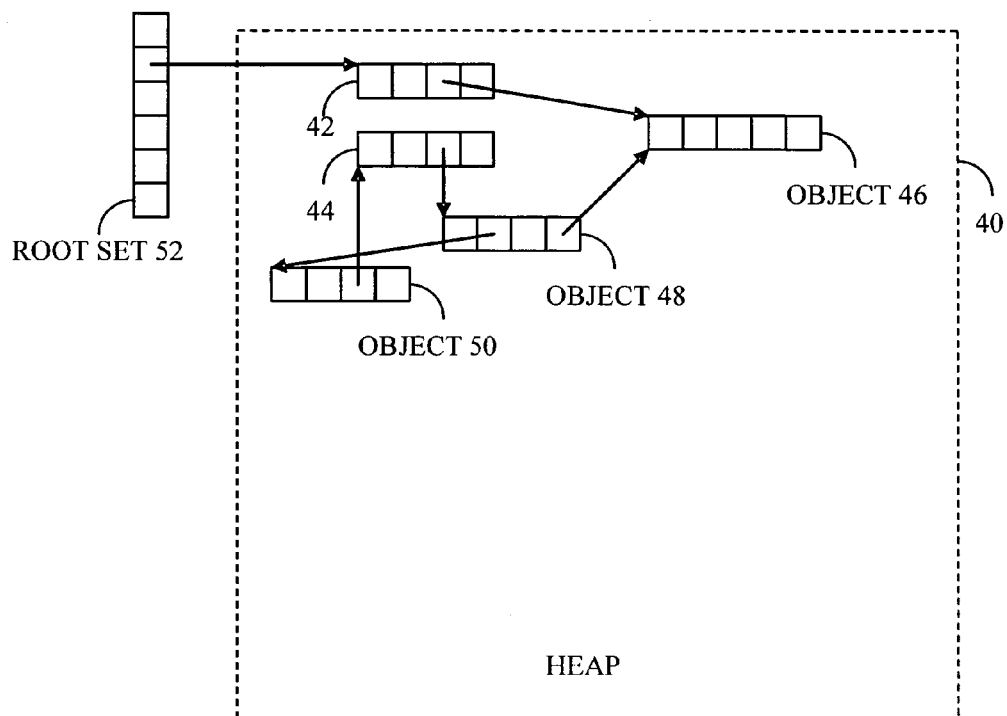
FIG. 4, discussed above, is a diagram that illustrates reference-bearing objects in a heap.
Figure 5:
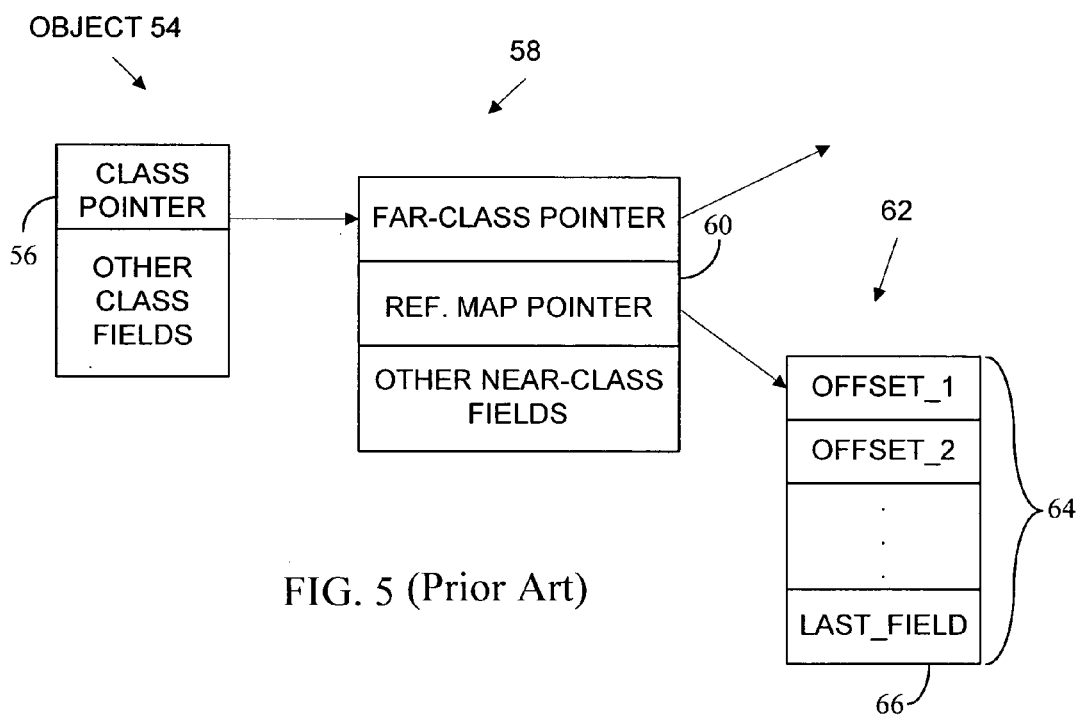
FIG. 5, discussed above, is a data-structure diagram of an exemplary relationship between an object and class information for the class to which the object belongs.
Figure 6:
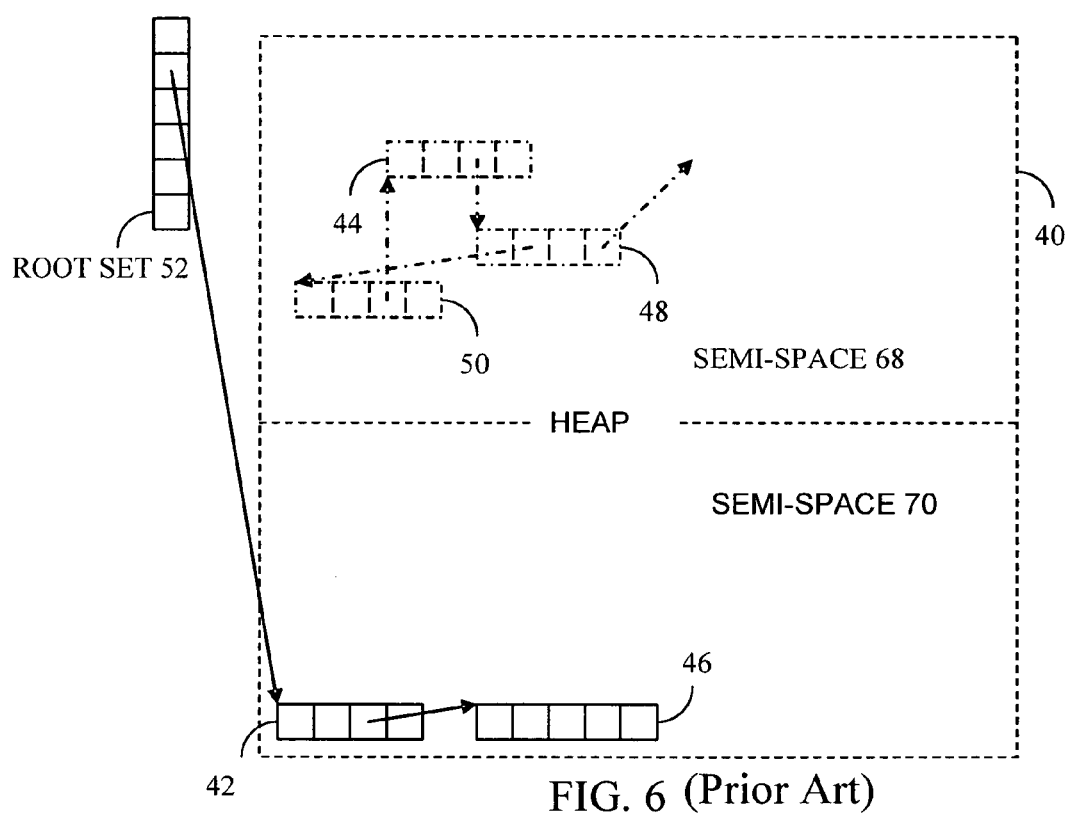
FIG. 6, discussed above, is a diagram illustrating a relocation operation used by some types of garbage collectors.
Figure 7:
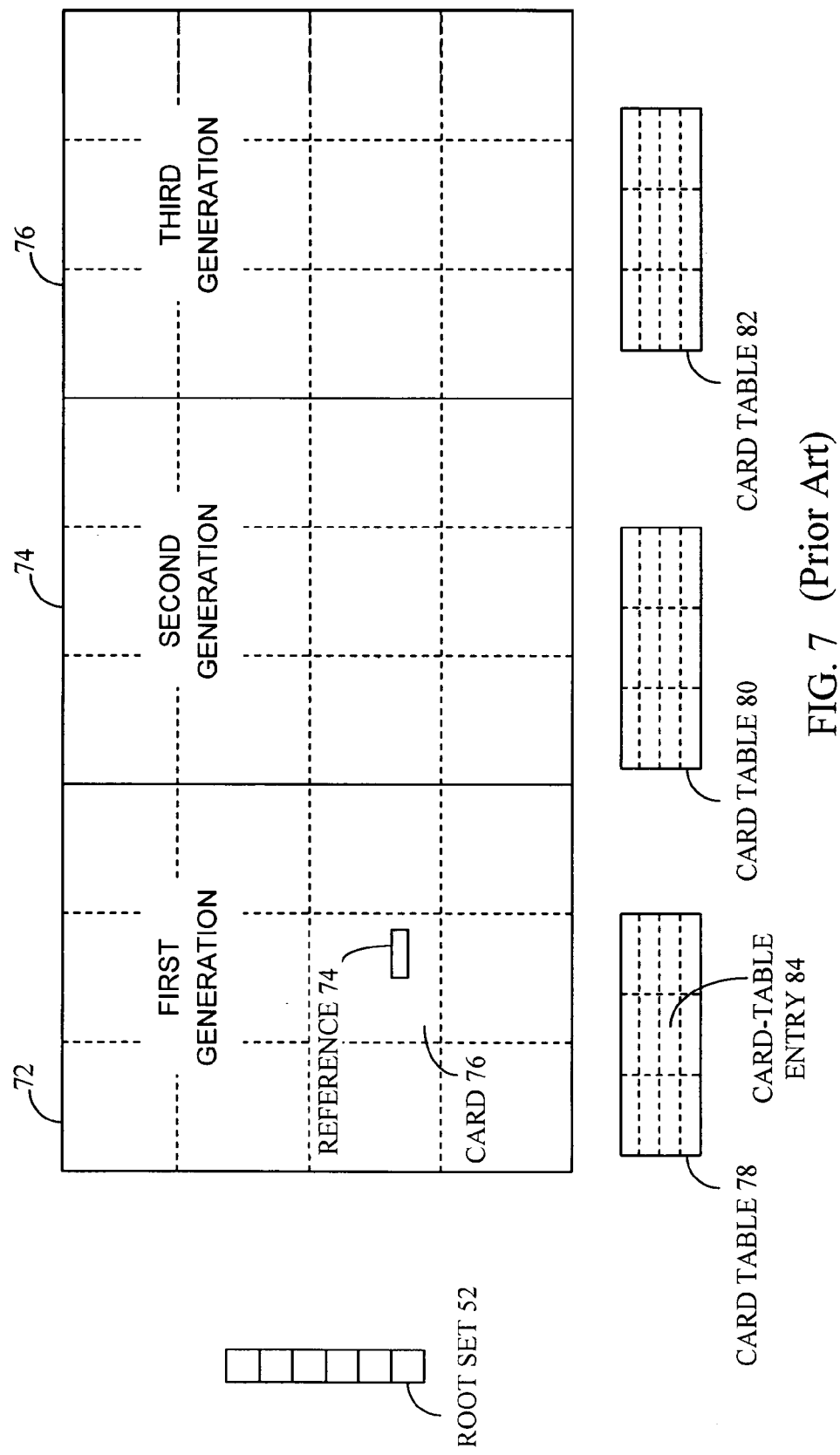
FIG. 7, discussed above, is a diagram that illustrates a garbage-collected heap's organization into generations.
Figure 8:
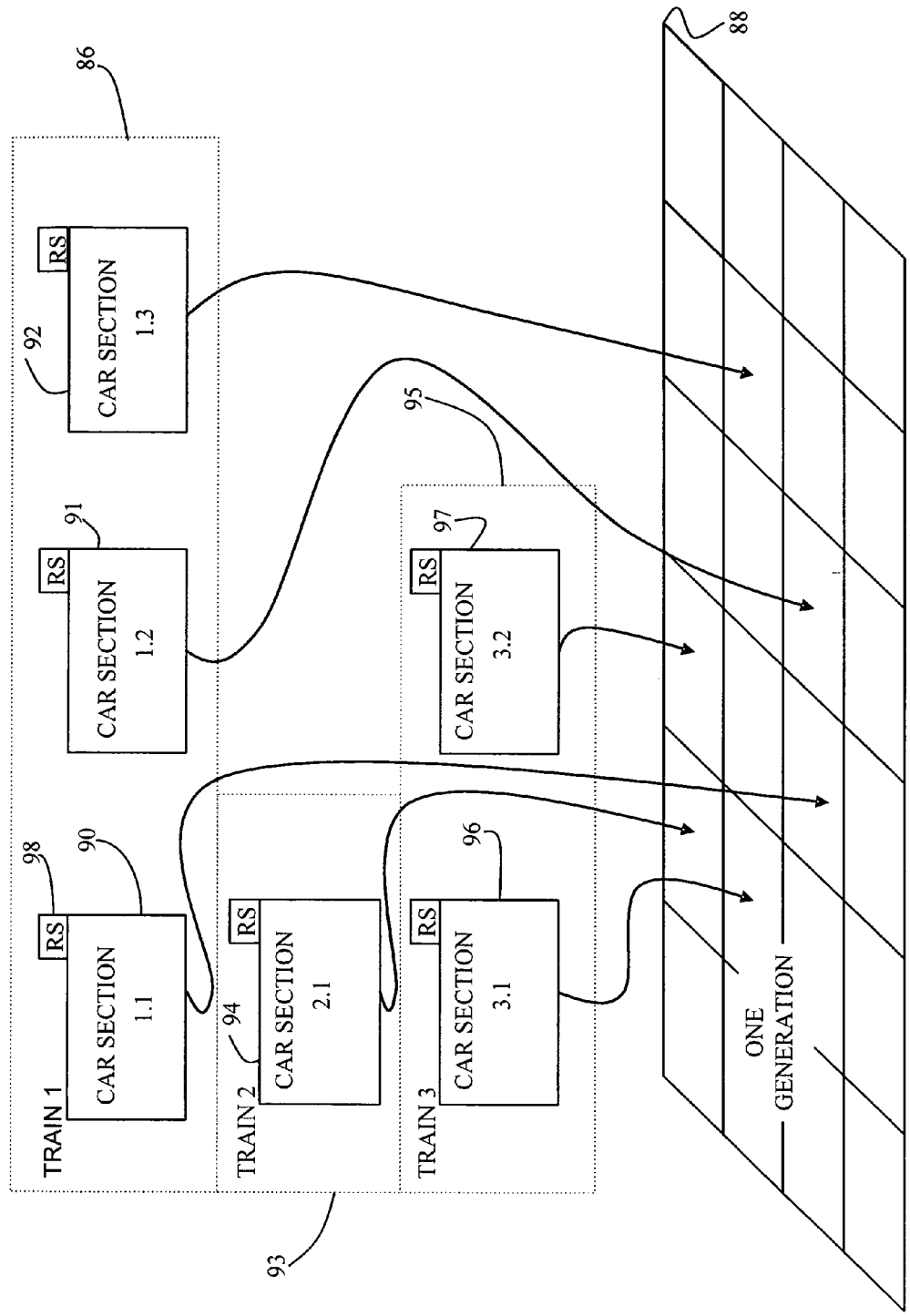
FIG. 8, discussed above, is a diagram that illustrates a generation organization employed for the train algorithm.
Figure 9A:
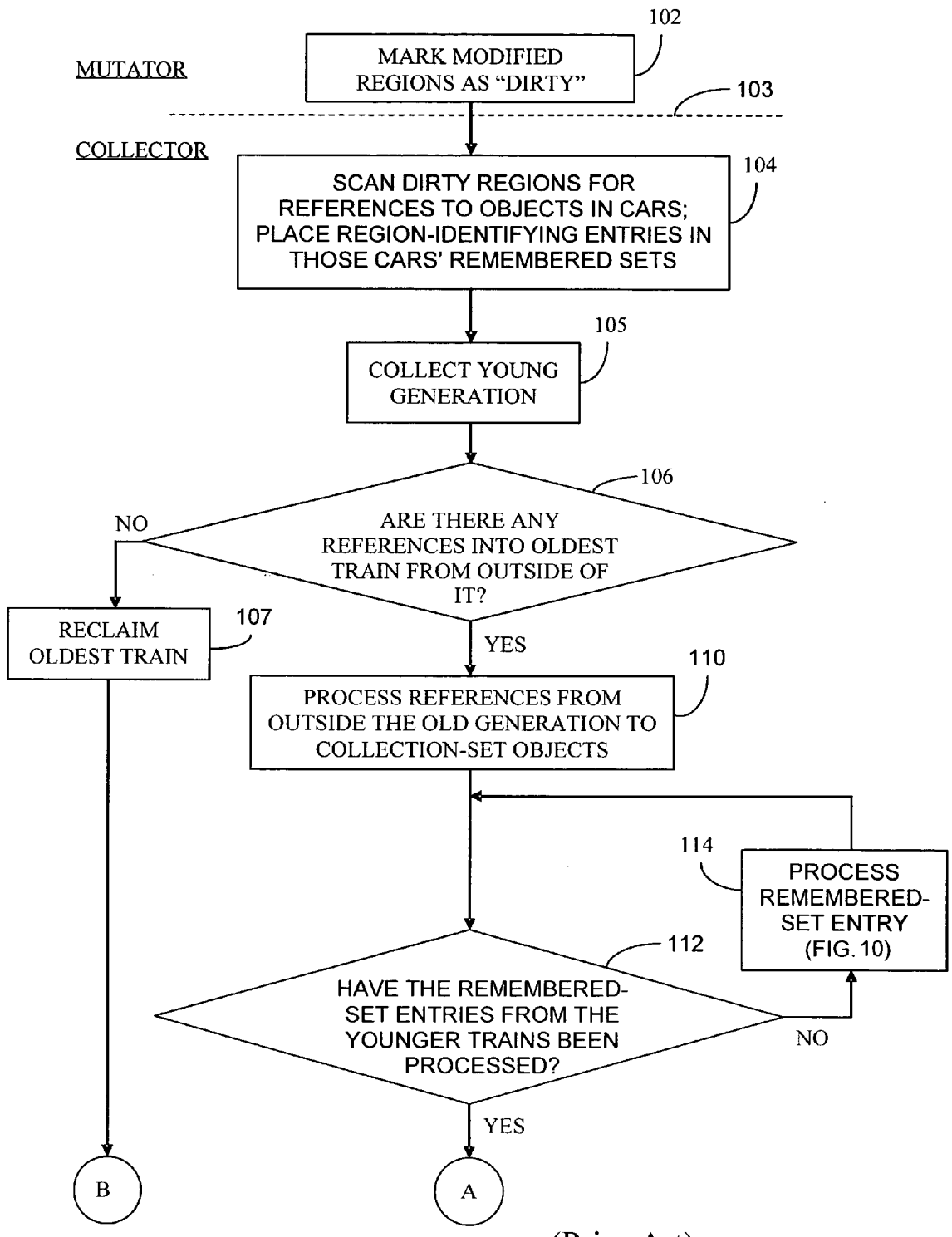
FIGS. 9A and 9B, discussed above, together constitute a flow chart that illustrates a garbage-collection interval that includes old-generation collection.
Figure 9B:
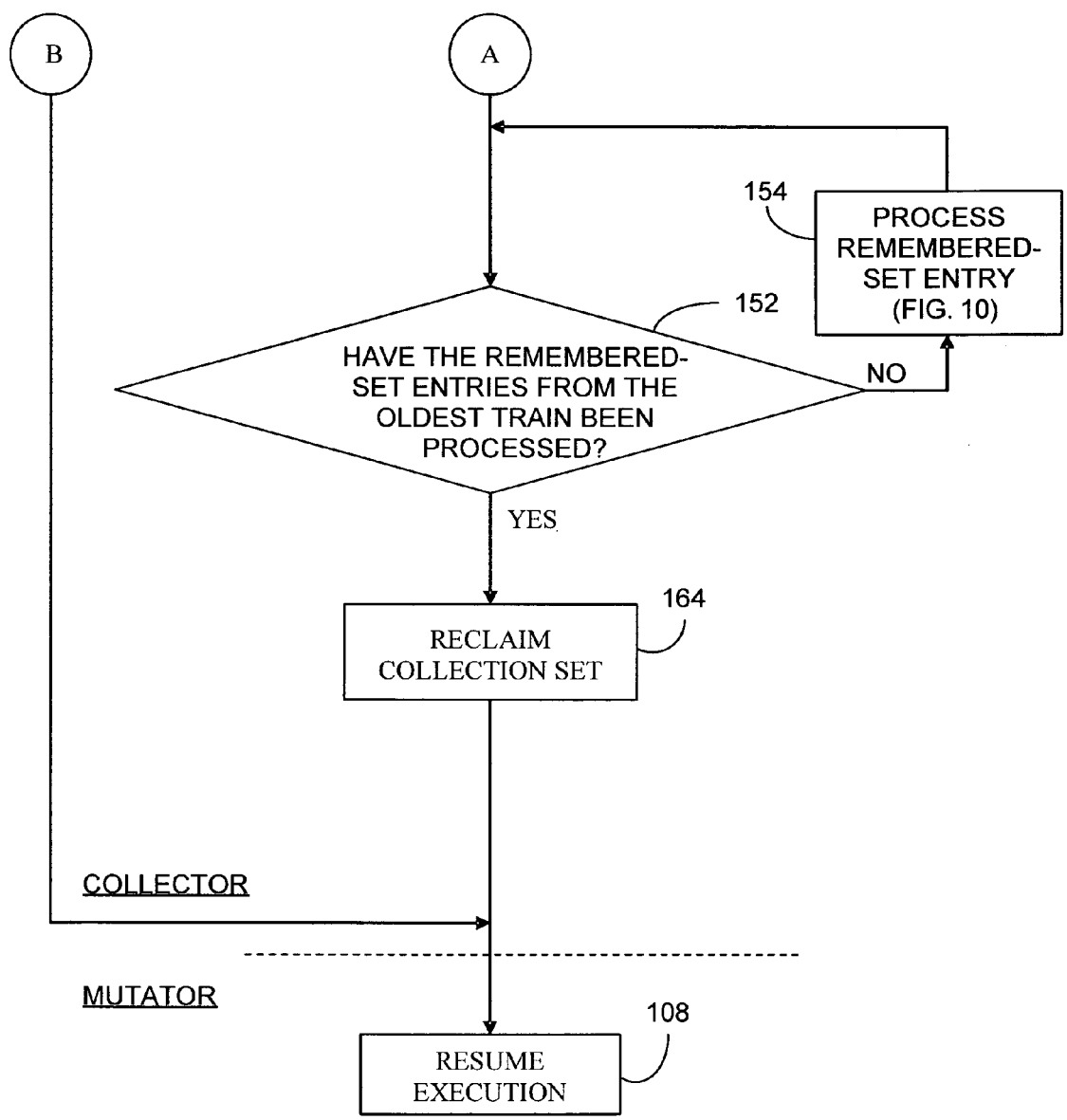
Figure 10:
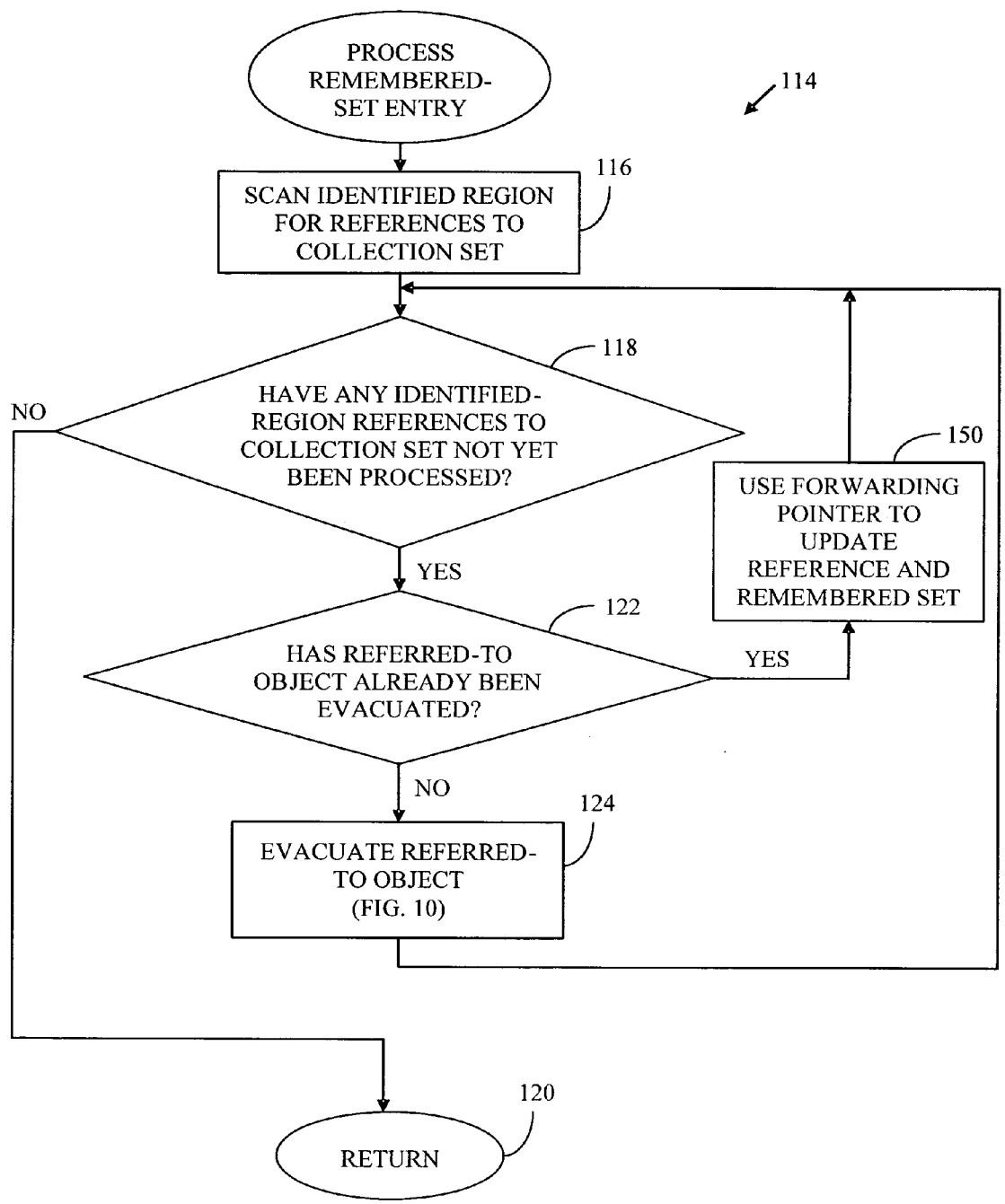
FIG. 10, discussed above, is a flow chart that illustrates in more detail the remembered-set processing included in FIG. 9A.
Figure 11:
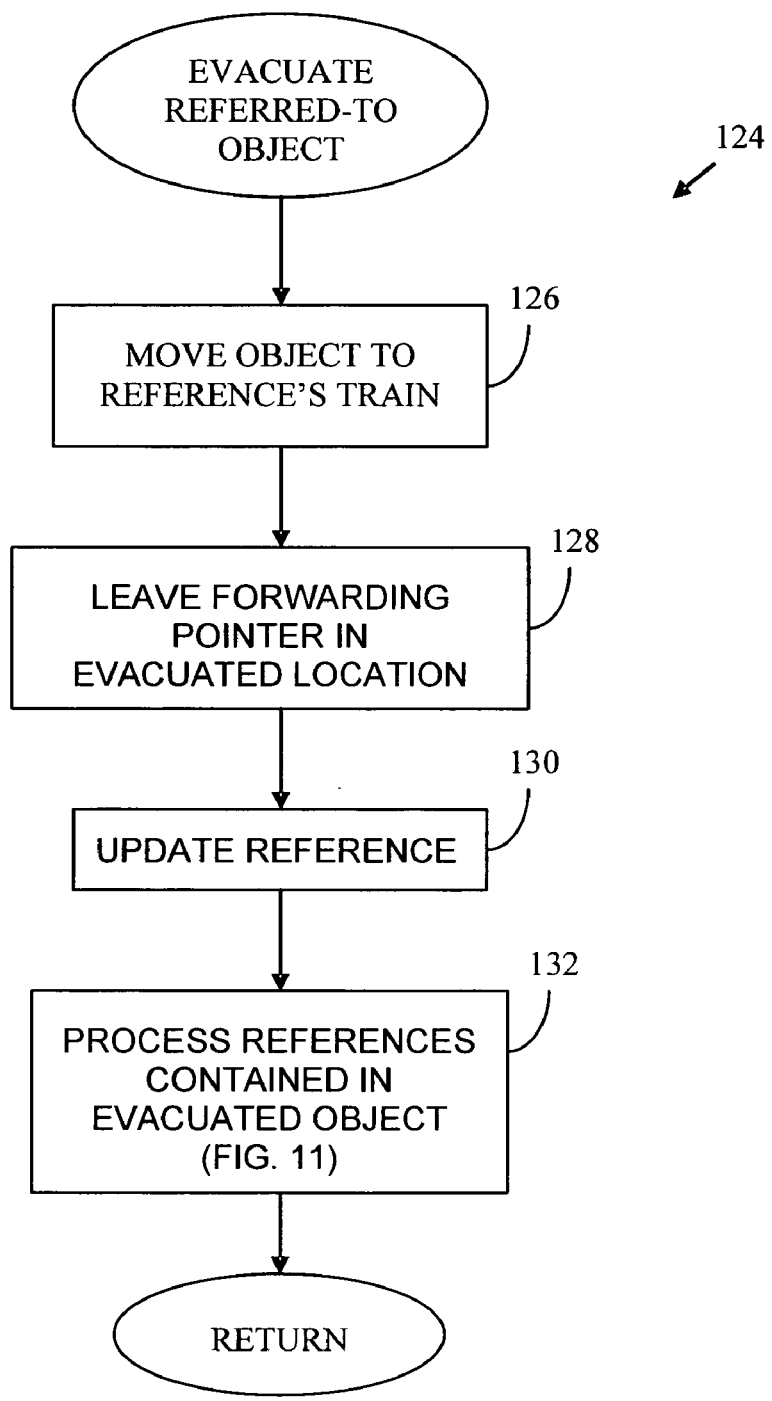
FIG. 11, discussed above, is a block diagram that illustrates in more detail the referred-to-object evacuation that FIG. 10 includes.
Figure 12A:
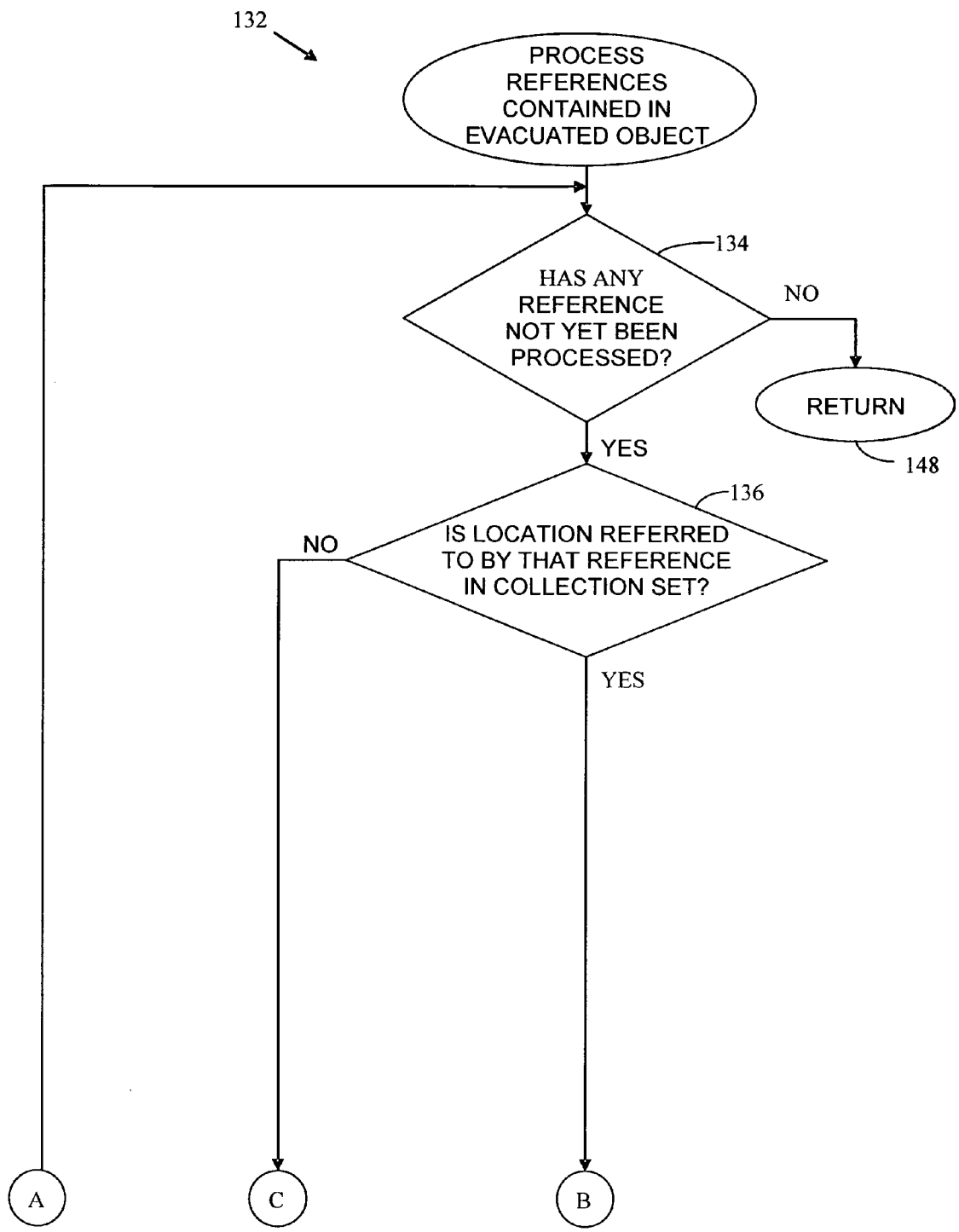
FIGS. 12A and 12B, discussed above, together form a flow chart that illustrates in more detail the FIG. 11 flow chart's step of processing evacuated objects' references.
Figure 12B:
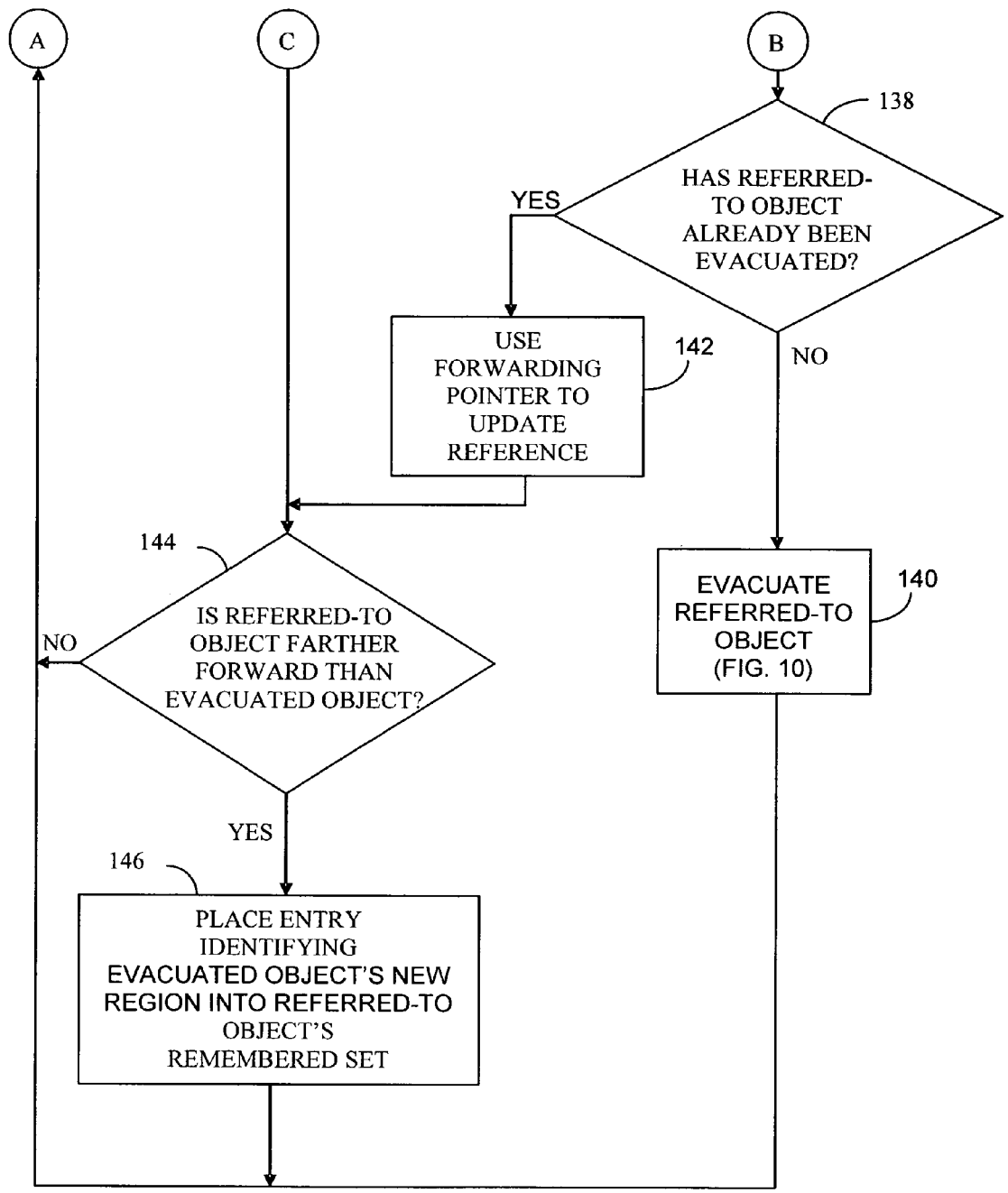
Figure 13:
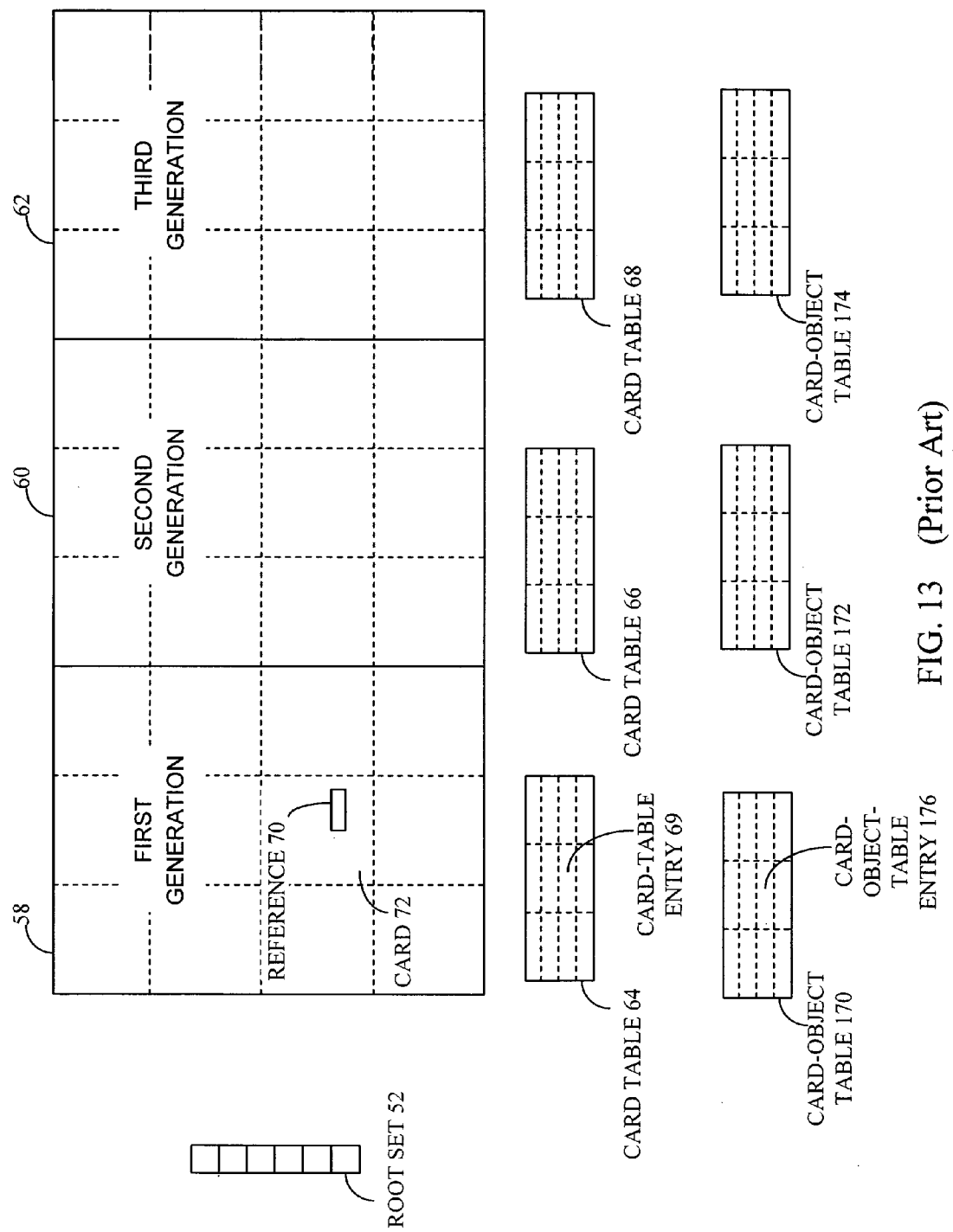
FIG. 13, discussed above, is a data-structure-diagram depicting card-object tables and their relationships to regions in the garbage-collected heap.
Figure 14:
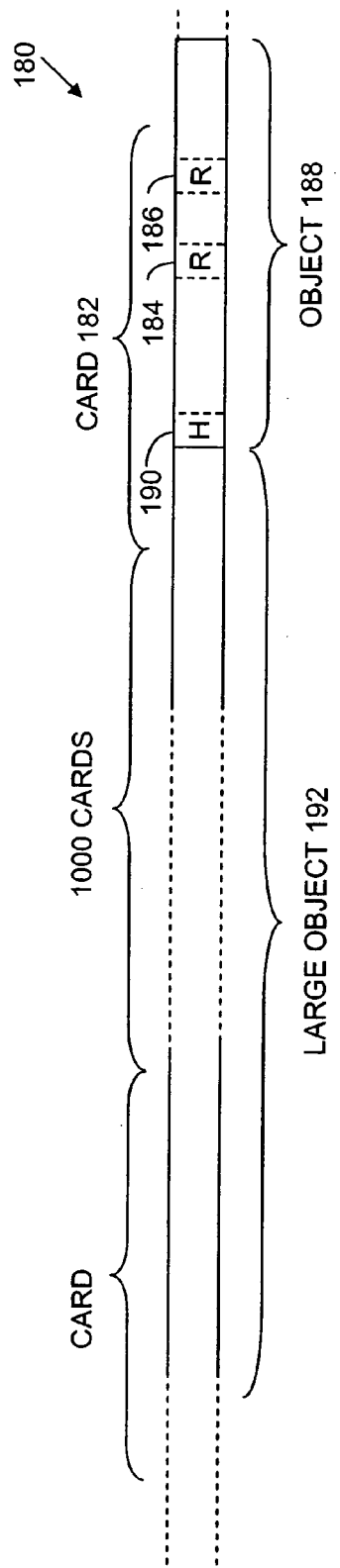
FIG. 14 is a data-structure-diagram illustrating a situation in which the only references in a card are located in an object that begins in the middle of the card.

For example, consider the situation represented by FIG. 14, which depicts a segment 180 of the garbage-collected heap. The segment is spanned by a number of cards, including card 182. The only references in card 182 are references 184 and 186, which are members of an object 188 that starts inside card 182. The card-object-table entry for card 182 will have been made in response to the mutator's request that object 188 be allocated. In accordance with this example encoding, the resultant entry's value is negative, so it indicates how many words there are between the end of card 182 and the start of object 188.

When the mutator later modifies reference 184 or 186, it executes a write barrier to notify the collector that card 182 has been "dirtied." In response, the collector scans that card for references during the next collection interval to identify the newly referred-to locations. To do so, it consults the card-object-table entry for card 182, thereby finds object 188's location, infers from that the location of the object's class-pointer-containing header 190, and concludes from a reference map thereby found that references are located at the addresses of references 184 and 186. It can then read those references and, if necessary, record their locations in the remembered sets associated with the referred-to objects' cars.

Contrast that relatively simple operation with one that would have resulted if the encoding were instead based solely on the location of the object in which card 182 begins. In the FIG. 14 scenario, that object, namely, object 192, is a large one, spanning over 1000 cards. Particularly in sorting, database, graphical, cryptographic, and heavily numerical applications, objects of this size are not uncommon. To encode information about where that object begins would take more than the two bytes to which the illustrated embodiment is able to restrict its entries. So the collector would have to skip back to find a card-object-table entry that indicates where the object starts. It would then need to look up that object's class information to determine where the object ends and whether it includes any references within card 182. And it would only be after doing all this that it would finally reach the format information for object 188 and thereby find the locations of references 184 and 186.

Moreover, there are objects—or at least free blocks encoded as objects—that are orders of magnitude larger than 1000 cards. The cost of locating the necessary information when such large objects are encountered increases nearly linearly with object size. In contrast, the illustrated encoding enables a card's references to be found in an amount of time that in the illustrated situation is independent of the size of the object in which the card begins.

Figure 15:
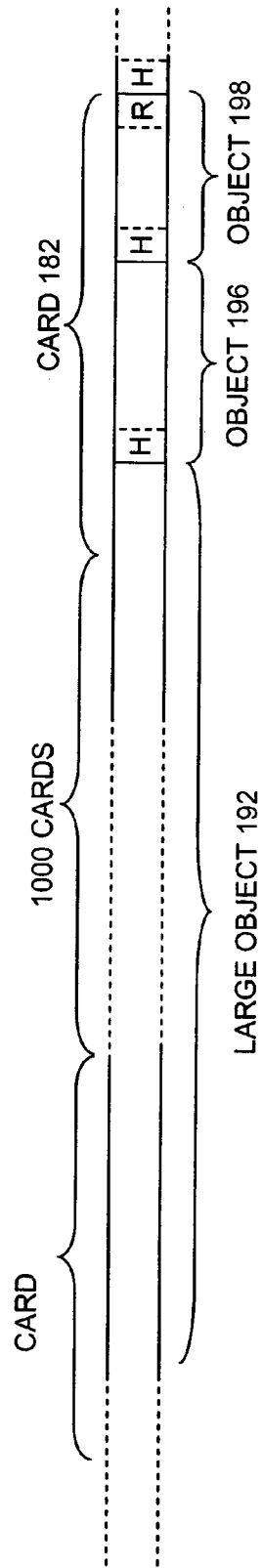
FIG. 15 is a data-structure-diagram illustrating a situation in which an object that begins in the middle of a card includes no references.

This savings results to a great extent from the fact that the encoding scheme concentrates more on locating references than on locating the object in which the card begins. This can be appreciated further by considering the situation that FIG. 15 illustrates. In that situation, the entry's value again represents an offset from the end of the card to the beginning of an object. However, although object 196 is the first object that begins in the card, that is not the object whose location the encoded offset specifies. Instead, the offset specifies object 198's location, since object 198 is the first reference-containing object in the card.

The illustrated embodiment's encoding scheme includes a value for the situation in which the card contains no references at all. If the entry's value is zero, it is interpreted as meaning that the card contains no references, so the collector does not need to look up any class information at all when it encounters a card so marked.

Indeed, the illustrated encoding scheme avoids the need to consult class information in certain other commonly encountered situations, too. When the entry's value v is greater than −385 and less than −256, for instance, the entry is interpreted as meaning that the card begins in a sequence of references with which an object terminates and that v+385 of those references are located at the beginning of the card. The collector can therefore locate all of those references without referring to the class information for the object that contains them.

Figure 16:
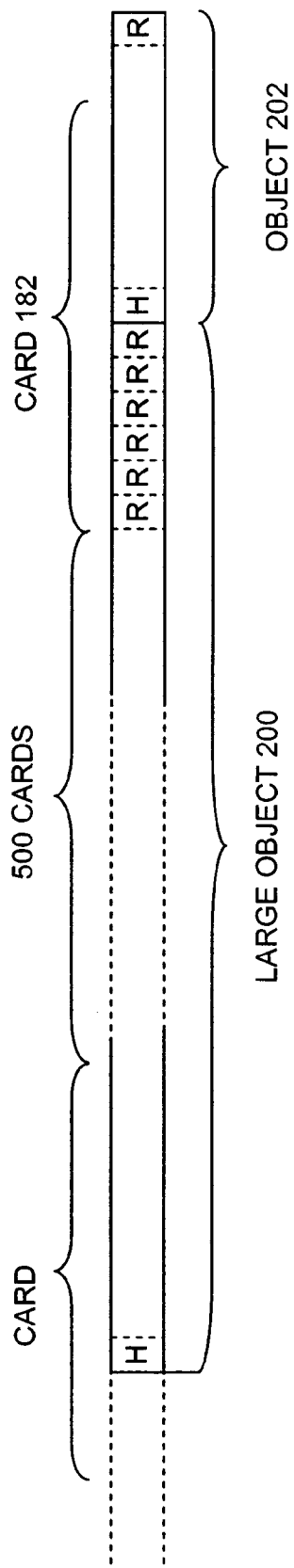
FIG. 16 is a data-structure-diagram that illustrates a situation in which a card begins with an object's terminal reference sequence.

FIG. 16 illustrates such a situation. In that drawing, card 182 begins with a sequence of references that, because of the values just mentioned, the collector can locate without referring to the class information for the large object 200 that contains them. This is particularly important if object 200 contains a large number of references, since the cost of finding a reference by using such a large object's reference map can be nearly linear in the number of references that the object contains. According to the illustrated encoding, the only reason why the collector would need to refer to class information would be to determine whether there are any references in the remainder of the card. For this it would consult the information for the class to which object 202 belongs. Moreover, an alternative to this embodiment would eliminate the need to refer to class information even for that case. Specifically, a value v between −639 and −385 could mean that the first v+640 words hold the references and that there are no other references in the card. This would eliminate the need to refer to class information at all to scan card 182.

Figure 17:
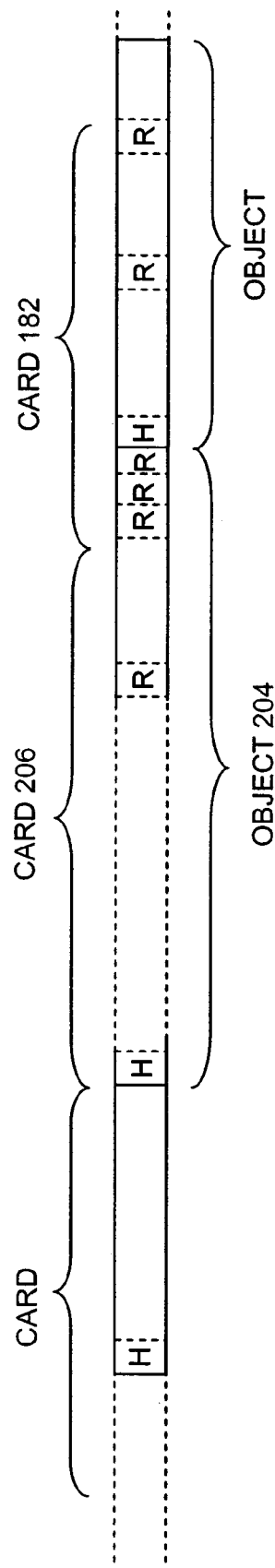
FIG. 17 is a data-structure-diagram that illustrates a situation in which a card begins with an object's terminal sequence of mixed reference and non-reference fields.

There do remain some situations in which this encoding scheme specifies the location of the object in which the card begins. FIG. 17 illustrates such a situation. Card 182 begins with references located in an object 204 that starts in a previous card 206. If, as FIG. 17 indicates, that object begins in the immediately previous card, the encoding would be one of the values in the range −256 to −129, which indicate how many words ahead of the end of card 182 object 204 begins. If object 204 instead began at some card ahead of card 206, then the entry's value would be a positive number, which represents the number of card-object-table-entries ahead the collector should look for an entry from which it can determine object 204's beginning address.

In summary, this first example encoding is as follows:

| | |
|---|---|
| v = 0: | There are no references in the card. |
| −256 ≦ v < 0: | The first object starts −v words ahead of the end of the card. |
| −384 ≦ v < −256: | The card's first v + 385 words are a sequence of references in which an object terminates. |
| v > 0: | Query the card-object-table entry −v entries from the current one. |

Note that the second range of values in the above encoding represents an offset of the object's start from the end of the card, not, as in the prior-art encoding described above, from the beginning. The fact that the object's start is expressed in terms of an off-set from the end of the card rather than from the beginning is convenient but not essential. What is important in the illustrated embodiment is that the encoding is not restricted to specifying the location of the object in which the card starts; by including values that indicate where objects start in the middle of the card, the encoding spares the collector the need to consult reference maps and other class information unecessarily.

As was stated above, this embodiment could be supplemented by values interpreted as meaning that the initial sequence of references includes the only references in the card. Also, an encoding that is essentially the same can, of course, be obtained from a different correspondence between values and meanings. Whereas it is convenient to interpret the entry as a signed integer and make the above-described associations between values and meanings, for example, the entry could instead be interpreted as an unsigned integer v whose meanings are as follows:

| | |
|---|---|
| v = 0: | There are no references in the card. |
| 0 < v ≦ 256: | The first object starts v words ahead of the end of the card. |
| 256 < v ≦ 384: | The card's first v − 256 words are a sequence of references in which an object terminates. |
| v > 384: | Query the card-object-table entry v − 384 entries from the current one. |

Note that the second range above is described merely as telling where some object starts in a card: it does not specify that the object whose location is thereby specified is the first reference-containing object. In most cases, it will be; there will be no reason to give the location of any previous object in that card if the previous object contains no references. But there are still occasions in which it is necessary or desirable to specify the location of the last object that includes fields in the card, even if none of those fields includes a reference.

Figure 18:
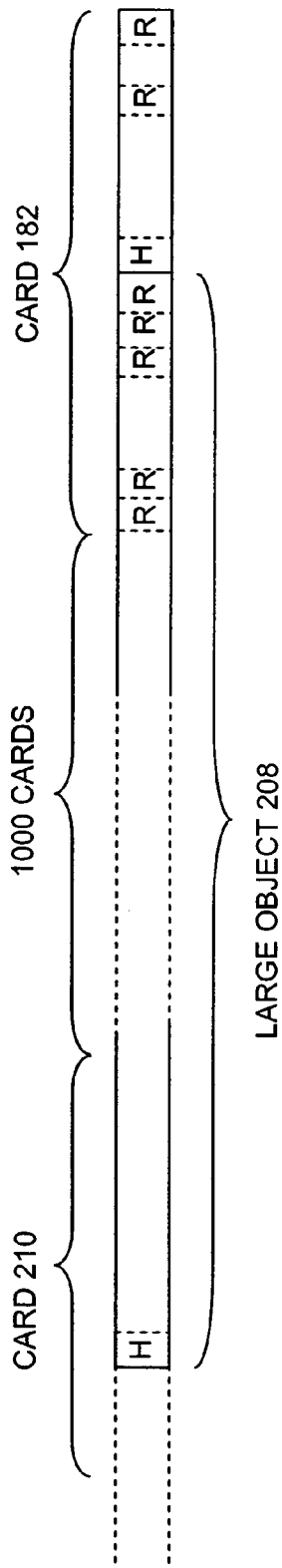
FIG. 18 is a data-structure-diagram that illustrates such a sequence at the end of a large object.

In this connection, consider FIG. 18. A large object 208 that begins in card 210 extends into card 182, where it terminates in a combination of reference and non-reference fields. To direct the collector to the class information that will tell it where the initial reference fields in card 182 are located, card 182's card-object-table entry needs to direct the collector to a previous card-object-table entry, such as the one for card 210. If the entry for card 210 were merely zero to indicate that card 210 contains no references, then card 182's card-object-table entry would have no entry to refer to for this information, at least if the card-object-table entry for the card immediately after card 210 is similarly zero. So, when a collector employing this encoding initially allocates a large object that contains references after its first couple of cards, it so encodes the card-object-table entry for its first card or its second card—r, preferably, for both—as to specify where the object begins, even if those cards do not themselves contain references.

The reason why it is preferable for both initial cards to contain that information is that it enables the collector to use a more-compact interpretation of the values that direct the collector to consult a previous card-object-table entry. Rather than meaning that the collector should consult the entry v entries before the current one, the collector can interpret it as directing the collector to consult the entry 2v entries before the current one, since the entry either for the card in which the object starts or for the card that follows it will be an even number of entries ahead.

Alignment considerations may enable essentially the same information to be encoded in a different set of values, one that is small enough to enable each entry to be restricted to only a single byte in length. For example, consider a system in which all objects are double-word aligned instead of single-word aligned. If the cards are still 512 bytes long, then only 128 different values are needed to specify the possible locations of objects in the associated card and the previous one. One might think that it would also require another 128 different values to specify all possible numbers of references in a reference sequence in which the card begins. But that number can be cut in half by taking advantage of the fact that an object whose size is an odd number of words can be so allocated that the (necessarily empty) word that follows it is at the same time given a NULL value or some other value that can be recognized not to be a reference. If that allocation rule prevails, each different value representing the number of initial references can be interpreted as representing a different even number of them, and the collector can test the value of the last word in the sequence to determine whether it is indeed a reference or is instead an empty inter-object word.

One way to divide up the value range to implement such an encoding is to consider each (one-byte) entry an unsigned integer and associate the following meanings with them:

| | |
|---|---|
| $v = 0$: | The card contains no references. |
| $0 < v \leq 128$: | An object begins $2v$ words before the end of the card. |
| $129 < v \leq 192$: | The card's first $2 (v - 128)$ words are a sequence of references in which an object terminates. |
| $v > 192$: | Query the card-object-table entry $2 (v - 192)$ entries before the current one to determine where the inital object starts. |

Note that this encoding also works if each reference occupies two words rather than one.

From the description so far, it is apparent that use of the above-described encodings can make the length of time required to locate a card's references essentially independent of object size except in the relatively few cards in which a very large object has a mixed sequence of reference and non-reference fields. Other embodiments of the invention can achieve that independence even in certain circumstances in which such mixed sequences result. Since a runtime system, of which the collector, compiler/interpreter, and class manager are all a part, has control of object layout, objects' fields can be so ordered as to tend to segregate reference from non-reference fields.

Let us take an example in which objects are, to the extent possible, laid out in the following order: {header, non-reference fields, reference fields}. In most cases, any object that crosses a boundary into a given card will end in (1) some number of references, (2) some number of non-reference fields, or (3) some number of non-reference fields followed by some number of reference fields. That is, most will not end in reference fields followed by non-reference fields or some other sequence. In object-oriented systems that support inheritance, objects of classes that inherit from parent classes may depart from this pattern, but no other objects need to.

To provide encodings for such sequences, a system of the above-mentioned type that uses single-word alignment for its objects and one-word-wide references may employ two-byte card-object-table entries interpreted as signed two-byte integers having the following possible values and interpretations:

| | |
|---|---|
| $v = 0$: | The card contains no references. |
| $-256 \leq v < 0$: | An object starts $-v$ words before the end of the card. |
| $v < -256$: | Query the card-object-table entry $-256 - v$ entries before the current one. |
| $v > 0$: | Treat the entry as two unsigned bytes, the first one encoding the number of non-reference fields with which the card begins, the second encoding the number of reference fields that immediately follow the (zero or more) non-reference fields with which the card begins. |

The last value range enables the collector to encode the locations of references in mixed sequences at the end of an object. In the discussion so far, it has been tacitly assumed that every object begins with a class-field-containing header portion. But some systems lay objects out differently. One layout approach does so to guarantee segregation between reference and non-reference fields, even in instances of subclasses.

Figure 19:
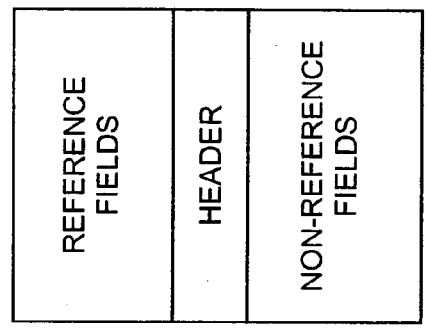
FIG. 19 is a data-structure diagram that illustrates an alternative object layout.

FIG. 19 illustrates such a layout. The object begins with any reference fields it may have. These are followed by a header field, with which the object starts if it includes no references. (We will refer to that field as a "header" even though it is not necessarily located at the start of the object.) Any fields containing non-reference members of the object follow the header.

The header field's first word is so tagged as to distinguish it from a reference field. One way of doing so takes advantage of the fact that objects will be at least word aligned and that the least-significant bits of all references will therefore be zeros; typically an object's first header word can be tagged by placing a one in one or more of the least-significant bits.

With this object format, there is never any need to encode the location of an object that crosses into the card. If objects are single-word aligned, for example, a card-object-table entry can take the form of a two-byte unsigned integer whose possible values $v$ have the following meanings:

| | |
|---|---|
| $v = 0$: | The card contains no references. |
| $0 < v \leq 128$: | The first reference-containing object begins $v$ words before the end of the card. |
| $128 < v \leq 256$: | The first $v - 128$ words hold references and are followed immediately by a header field. |

Reflection reveals that no further values are needed. If an object crosses over into the card but includes no references in the card, there is no need to know where the object starts. If an object that crosses into the card does include references in that card, then the card begins with a reference-only sequence of which the card-object-table entry gives the length. The object's class information needs to be consulted only to find where the object ends. If it ends in the same card, the collector can then begin reading the next object's references (if any), concluding that it has reached the end of that object's references, and thus the beginning of the object's class-pointer-containing header, when it encounters a word that does not contain a valid reference value.

At this point it should additionally be apparent that card-object-table entries that are only one byte in length rather than the two assumed above would actually be adequate. There is only one value, namely, 256, in the above encoding scheme that does not fit into a single byte. That value indicates that all of the card's words contain references. But that value can be dispensed with by changing the interpretation of v=255. That value could be interpreted as meaning that the card begins with either 255 or 256 references. In scanning a card whose card-object-table entry contains this value, the collector would test the 256th—i.e., the last—word in the card to determine whether it contains a valid reference value, typically by determining whether its two least-significant bits are zeros. If they are not, the collector can conclude that the card's last word is not a reference but instead is part of the object's header. Otherwise, it concludes that the last word, too, is a reference.

Similar encodings could be used in systems that also use one-word references but double-word align their objects. Here is one such encoding:

| | |
|---|---|
| v = 0: | The card is empty. |
| 0 < v ≦ 64: | The first object starts 2v words in front of the end of the card. |
| 64 < v ≦ 192: | The card begins with a sequence of v − 64 words of references immediately followed by the object's header. |

Here is another example encoding, this one for a system in which objects are double-word aligned and references occupy two words:

| | |
|---|---|
| v = 0: | The card is empty. |
| 0 < v ≦ 64: | The first object starts 2v words ahead of the end of the card. |
| 64 < v ≦ 128: | The first v − 64 two-word fields hold references. |

In the foregoing examples, certain possible card-object-table values indicate directly where references are located. When the card-object-table entry contains such a value, at least some of the references in the card can be located without referring to the object's class information. This is advantageous in many collector designs. But some collector designs require that the information in object headers, such as class information or per-object marks, be accessed even if the references can be located without doing so. In such collector designs, there is less value in being able to locate the reference without referring to the object's class information. But other aspects of the invention can still be beneficial. The cost of using the example encoding about to be described, for example, will in many cases still be largely independent of the size of the object in which the card begins, even when it is used by a collector that always needs to consult the class information for the object that contains the reference.

As the previous examples were, this one is intended for a card size of 512 bytes. Moreover, it presupposes double-word alignment of objects, i.e., that every reference ends in $000_2$. (An object whose length is an odd number of words in such a system is typically followed by a NULL word; the space it takes up would thus be "rounded up" to an even number of words.) In this approach, each card-object-table entry is a single byte in length, but the entries for a four-card region encompassed by a single object can sometimes be interpreted as together representing a complete pointer to the start of the object or to its class-pointer-containing header. (Of course, this assumes that the lengths of the entries for four cards add up to the length of a complete address, as they would if entries are one byte in length and the system uses thirty-two-bit addresses. The entries for a greater or lesser number of cards can be interpreted as such a pointer if the entry or address length is different. In a system in which the address length is sixty-four bits, for example, eight single-byte entries could be thus interpreted.)

Figure 20A:
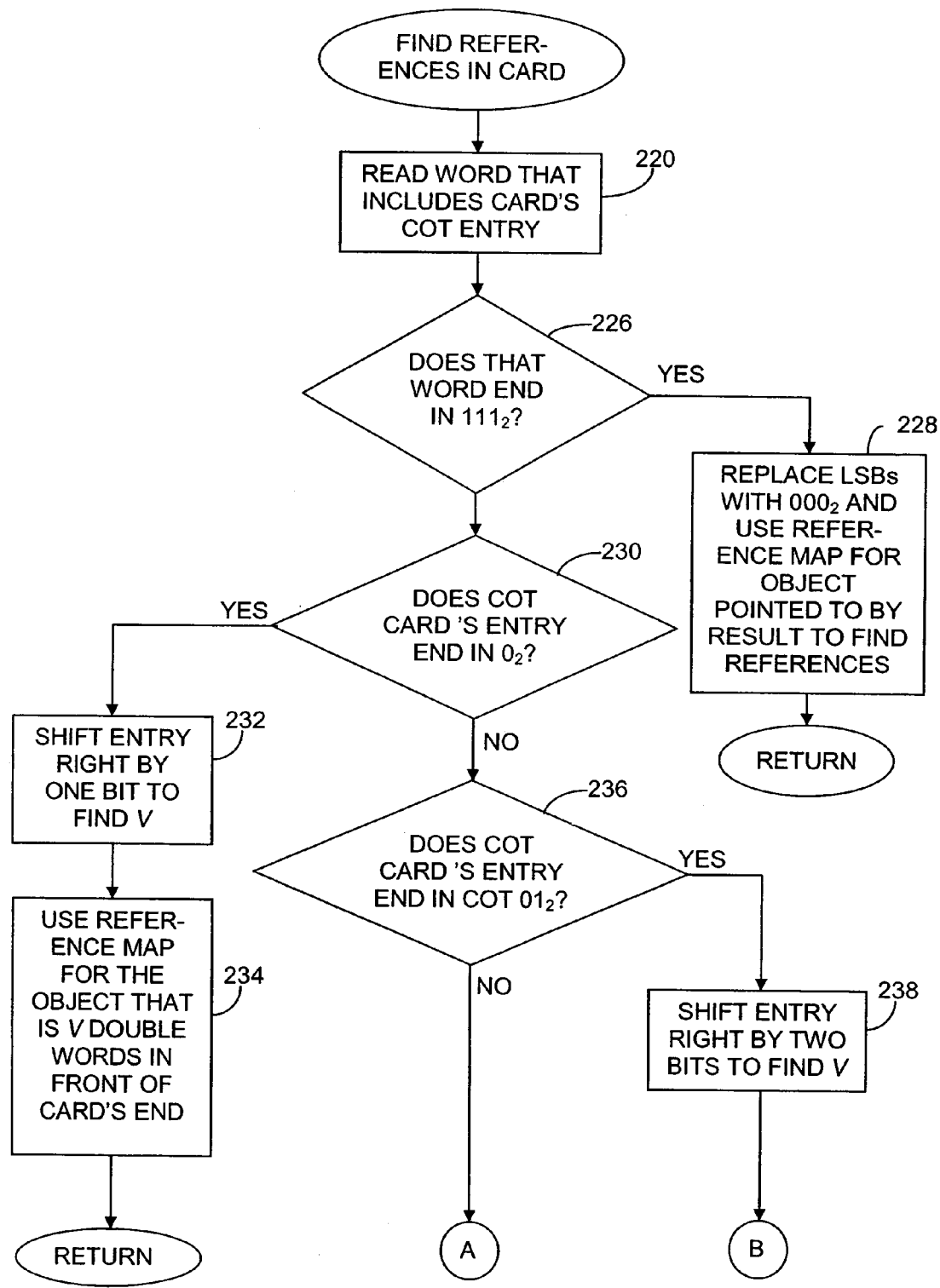
FIGS. 20A and 20B together constitute a flow chart of a routine for decoding card-object-table entries in accordance with one embodiment of the invention.
Figure 20B:
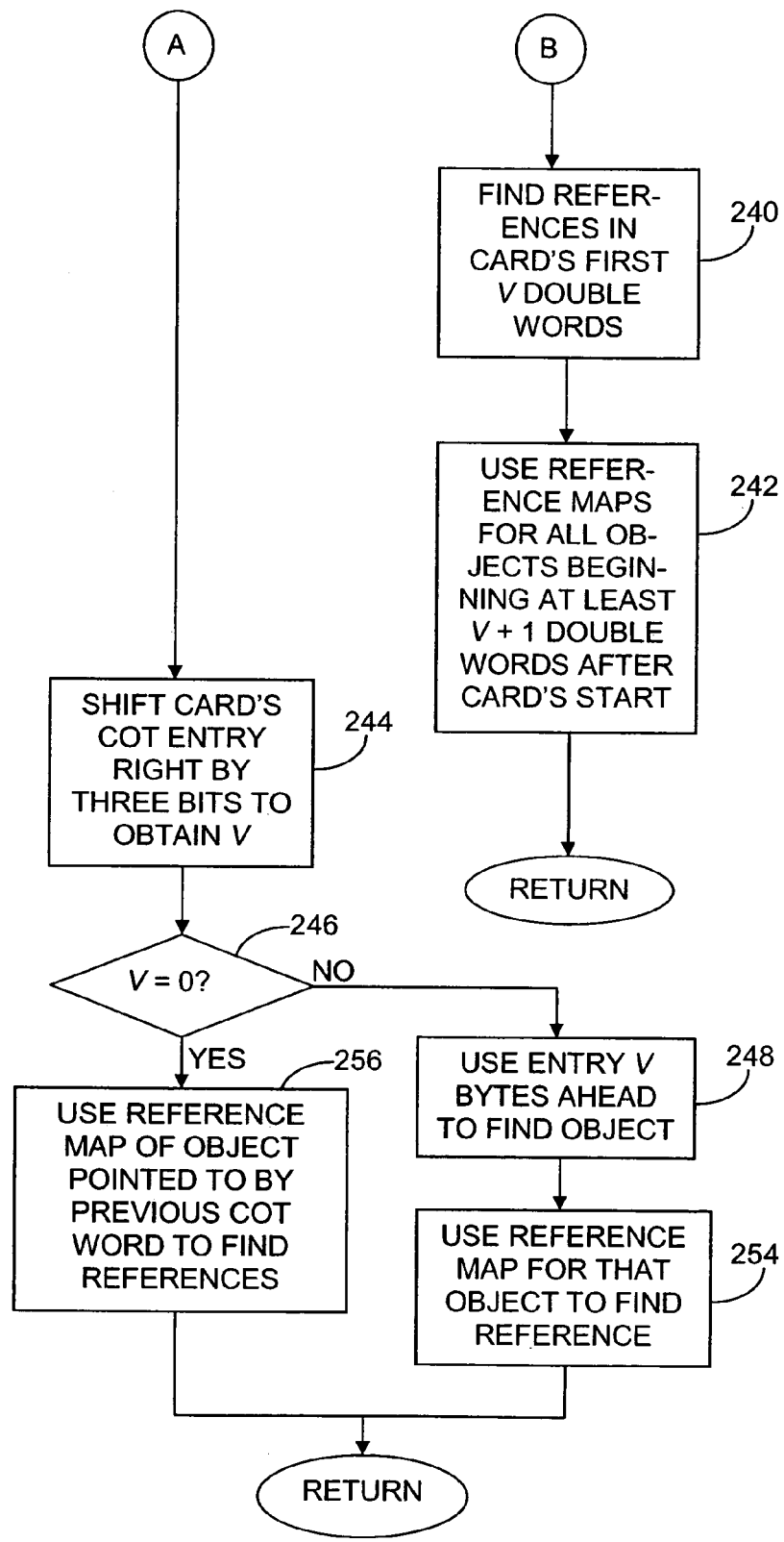
Figure 21:
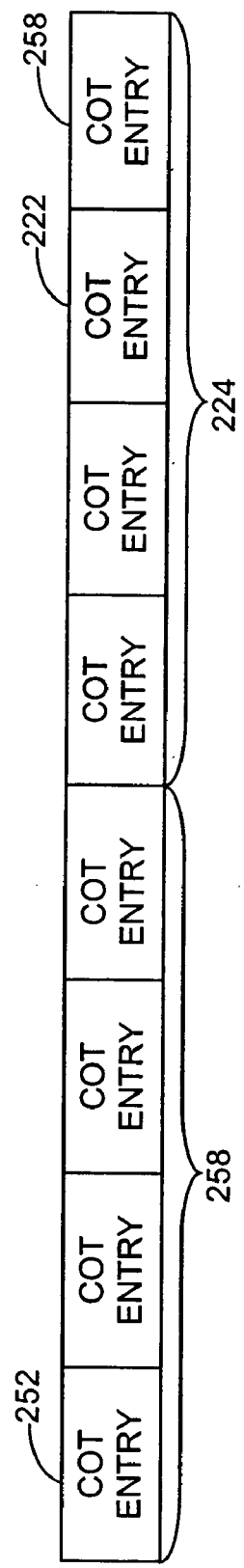
FIG. 21 is a diagram depicting two words of a card-object table.

To understand this encoding scheme, it is best to consider the routine that the collector follows to find the references in a given card. FIGS. 20A and 20B (together, "FIG. 20") illustrate that routine. As block 220 indicates, the collector does not begin by reading just the one-byte card-object-table entry corresponding to the card of interest. Instead, it begins by reading the entire four-byte-aligned word that contains that entry. For example, if the entry corresponding to the card of interest is FIG. 21's entry 222, the collector reads the entire four-byte word 224 that includes that entry. As FIG. 20's block 226 indicates, it then determines whether the four entries that make up that word actually encode a complete pointer to a common object that contains all of the cards associated with the entries that make up word 224. The possible entry values are so selected that, unless they are being used together with other entries to form such a pointer, they do not end in $111_2$. A word ending in that three-bit sequence indicates that it is to be decoded as an object's address. Specifically, its last three bits are replaced with $000_2$ to arrive at the address value. As block 228 indicates, therefore, the collector finds the references in the card by using the object's reference map.

If the word that encompasses the entry of interest does not encode a pointer to an object, the collector tests the (single-byte) entry itself, as block 230 indicates, to determine how to interpret it. A terminal $0_2$ in that entry indicates that the entry's seven most-significant bits represent an offset from the end of the card to the location at which the object containing the card's first reference begins. If those seven bits are interpreted as an unsigned integer v, then the object containing that reference begins v double words in front of the end of the card. That is, v=0 indicates that the card contains no references, while the remaining 127 possible values represent all possible object locations within the card of interest and the card in front of it, with the exception of the object position that starts at the beginning of the previous card. As blocks 232 and 234 indicate, the collector uses the reference map for the object thereby located to locate the references in the card of interest.

If the determination represented by block 230 is that the card-object-table entry does not end in $0_2$, the collector checks the entry to determine whether it ends in $01_2$, as block 236 indicates. If it does, the collector finds the value v that results from treating the entry's six most-significant bits as an unsigned integer v, as block 238 indicates. As block 240 indicates, it then interprets this value as indicating that the card begins within an object that ends in a sequence of references occupying 2v words at the beginning of the card. In a thirty-two-bit system, the sequence may actually occupy only an odd number of words, so the collector will test the contents of the last word in the 2v-word sequence for the NULL value to determine whether it is actually a reference. (Of course, this is not an issue when this approach is approach is applied in a sixty-four-bit system.) As block 242 indicates, the collector uses subsequent objects' format information to locate any further references.

Note that the location of the object that contains the initial references cannot be inferred from values in this range, i.e., from the values that end in $01_2$. Therefore, collectors that need to rely on the card-object-table entries to find the containing objects will not use these particular values. They will instead use others of this encoding scheme's values and thereby provide information from which the object's location can be inferred. As was mentioned above, a full-word sequence of card-object-table entries can explicitly specify the object's location if the object spans the four cards corresponding to that word's constituent entries. And, as was also mentioned above, the individual card-object-table entry can give an offset that specifies the object's location if it starts at any location within the card or the previous card except for the previous card's first double word. To provide for the remaining possibilities, this encoding scheme provides seven values that end in $100_2$. (Of course, there are thirty-two possible byte values that end in that bit sequence, but this encoding scheme uses only seven of them.)

As FIG. 20's block 244 indicates, the collector obtains a value v by right shifting such a card-object-table entry by three bits. If $1<v\leq7$, the collector consults the entry v bytes before the current one, as blocks 246 and 248 indicate. The value thereby found will specify the location in the corresponding card at which the object that extends into the card of interest begins. Suppose the card of interest is the one corresponding to the last card-object-table entry 250 in FIG. 21, for instance. A value v=1 means that the value contained in the immediately preceding entry 222 will encode by offset the location of the object in which the card corresponding to entry 250 begins. A value v=7 would instead indicate that the entry 252 located seven bytes before entry 250 should be consulted to find the start of that object. As FIG. 20's block 254 indicates, the collector finds references by using the reference map for the object thereby found.

There is no reason for the collector to be directed to an entry any farther back than seven bytes. If the object does begin somewhere before the card corresponding to entry 252, v's value will be zero, which, as FIG. 20's block 256 indicates, means that the location of the object is given by the previous (four-byte-aligned) card-object-table word 258.

In short, this encoding scheme enables the collector to find the relevant reference map in a length of time that is essentially independent of the size of the object that contains the references.

By not restricting its conveyed information to the location of the object in which the card starts, the present invention eliminates much or all of the degree to which finding specific object fields, such as reference fields, depends on such objects' sizes. And, as was explained above, the invention is flexible enough to be adapted to the requirements of different types of collectors. It therefore constitutes a significant advance in the art.

What is claimed is:

1. A garbage collection, method comprising:
   A) treating at least a portion of a garbage-collected heap in the memory as divided into cards with which the garbage collector associates respective card-object-table entries;
   B) maintaining the card-object-table entries with values selected from a value range that includes:
      i) at least one of a set of card-object-table entry values, each of which the collector interprets as locator information representing the locations of references in the card with which that entry is associated; and
      ii) at least one of a set of card-object-table entry values, each of which the collector interprets as locator information representing the location within the card at which is located a start of an object that begins somewhere between the ends of the card with which that entry is associated;
   C) basing on those interpretations a determination of which locations in the cards contain references;
   D) determining the reachability of objects from the contents of locations thereby determined to contain references; and
   E) reclaiming memory space occupied by objects thereby determined not to be reachable.

2. A method as defined in claim 1 wherein the collector interprets one card-object-table entry value as indicating that the card contains no references.

3. A method as defined in claim 1 wherein the collector interprets each value of a card-object-table entry associated with a given card, as representing the location at which is located a predetermined field of an object in which a predetermined location in the given card is located.

4. A method as defined in claim 3 wherein the collector interprets each value of a card-object-table entry associated with a given card, as representing the location of the start of an object in which the given card starts.

5. A method as defined in claim 1 wherein the collector:
   F) determines whether a multiple-card-object-table-entry sequence that includes the card-object-table entry with which that card is associated satisfies a predetermined common-object criterion; and
   G) if that multiple-card-object-entry sequence is thereby determined to satisfy the common-object criterion, interprets that multiple-card-object-entry sequence as an indicator of the location of an object in which the card begins.

6. A method as defined in claim 1 wherein the collector interprets each value of a card-object-table entry associated with a given card, as representing the length of a sequence of references with which the given card begins.

7. A method as defined in claim 1 wherein the collector interprets each value of a card-object-table entry associated with a given card, as representing the lengths of respective sequences of references and non-reference fields with which the given card begins.

8. A method as defined in claim 1 wherein the garbage collector interprets each value in a set of possible values of the locator information in a given card-object-table entry as indicating that a card-object-table entry ahead of the given card-object-table entry is an indicator of the location of an object in which the card associated with the given card-object-table entry begins.

9. A method as defined in claim 1 wherein the garbage collector interprets at least one possible value of the locator information in a given card-object-table entry as indicating that a multiple-card-object-table-entry sequence ahead of the given card-object-table entry is an indicator of the location of an object in which the card associated with the given card-object-table entry begins.

10. A computer system comprising:
    A) processor circuitry operable to execute processor instructions; and
    B) memory circuitry, to which the processor circuitry is responsive, that contains processor instructions readable by the processor circuitry to configure the computer system to operate as a garbage collector that:
       i) treats at least a portion of a garbage-collected heap in the memory as divided into cards with which the garbage collector associates respective card-object-table entries;

ii) maintains the card-object-table entries with values selected from a value range that includes:
   a) at least one of a set of card-object-table entry values, each of which the collector interprets as locator information representing the locations of references in the card with which that entry is associated; and
   b) at least one of a set of card-object-table entry values, each of which the collector interprets as locator information representing the location within the card at which is located a start of an object that begins somewhere between the ends of the card with which that entry is associated;
iii) bases on those interpretations a determination of which locations in the cards contain references;
iv) determines the reachability of objects from the contents of locations thereby determined to contain references; and C) reclaims memory space occupied by objects thereby determined not to be reachable.

11. A computer system as defined in claim 10 wherein the collector interprets one card-object-table entry value as indicating that the card contains no references.

12. A computer system as defined in claim 10 wherein the collector interprets each value of a card-object-table entry associated with a given card, as representing the location at which is located a predetermined field of an object in which a predetermined location in the given card is located.

13. A computer system as defined in claim 12 wherein the collector interprets each value of a card-object-table entry associated with a given card, as representing the location of the start of an object in which the given card starts.

14. A computer system as defined in claim 10 wherein the collector:
   D) determines whether a multiple-card-object-table-entry sequence that includes the card-object-table entry with which that card is associated satisfies a predetermined common-object criterion; and
   E) if that multiple-card-object-entry sequence is thereby determined to satisfy the common-object criterion, interprets that multiple-card-object-entry sequence as an indicator of the location of an object in which the card begins.

15. A computer system as defined in claim 10 wherein the collector interprets each value of a card-object-table entry associated with a given card, as representing the length of a sequence of references with which the given card begins.

16. A computer system as defined in claim 10 wherein the collector interprets each value of a card-object-table entry associated with a given card, as representing the lengths of respective sequences of references and non-reference fields with which the given card begins.

17. A computer system as defined in claim 10 wherein the garbage collector interprets each value in a set of possible values of the locator information in a given card-object-table entry as indicating that a card-object-table entry ahead of the given card-object-table entry is an indicator of the location of an object in which the card associated with the given card-object-table entry begins.

18. A computer system as defined in claim 10 wherein the garbage collector interprets at least one possible value of the locator information in a given card-object-table entry as indicating that a multiple-card-object-table-entry sequence ahead of the given card-object-table entry is an indicator of the location of an object in which the card associated with the given card-object-table entry begins.

19. A storage medium containing instructions readable by a computer system that includes memory to configure the computer system to operate as a garbage collector that:
   A) treats at least a portion of a garbage-collected heap in the memory as divided into cards with which the garbage collector associates respective card-object-table entries;
   B) maintains the card-object-table entries with values selected from a value range that includes:
      i) at least one of a set of card-object-table entry values, each of which the collector interprets as locator information representing the locations of references in the card with which that entry is associated; and
      ii) at least one of a set of card-object-table entry values, each of which the collector interprets as locator information representing the location within the card at which is located a start of an object that begins somewhere between the ends of the card with which that entry is associated;
   C) bases on those interpretations a determination of which locations in the cards contain references;
   D) determines the reachability of objects from the contents of locations thereby determined to contain references; and
   E) reclaims memory space occupied by objects thereby determined not to be reachable.

20. A storage medium as defined in claim 19 wherein the collector interprets one value of a card-object-table entry, as indicating that the card contains no references.

21. A storage medium as defined in claim 19 wherein the collector interprets each value of a card-object-table entry associated with a given card, as representing the location at which is located a predetermined field of an object in which a predetermined location in the given card is located.

22. A storage medium as defined in claim 21 wherein the collector interprets each value of a card-object-table entry associated with a given card, as representing the location of the start of an object in which the given card starts.

23. A storage medium as defined in claim 19 wherein the collector:
   F) determines whether a multiple-card-object-table-entry sequence that includes the card-object-table entry with which that card is associated satisfies a predetermined common-object criterion; and
   G) if that multiple-card-object-entry sequence is thereby determined to satisfy the common-object criterion, interprets that multiple-card-object-entry sequence as an indicator of the location of an object in which the card begins.

24. A storage medium as defined in claim 19 wherein the collector interprets each value of a card-object-table entry associated with a given card, as representing the length of a sequence of references with which the given card begins.

25. A storage medium as defined in claim 19 wherein the collector interprets each value of a card-object-table entry associated with a given card, as representing the lengths of respective sequences of references and non-reference fields with which the given card begins.

26. A storage medium as defined in claim 19 wherein the garbage collector interprets each value in a set of possible values of the locator information in a given card-object-table entry as indicating that a card-object-table entry ahead of the given card-object-table entry is an indicator of the location of an object in which the card associated with the given card-object-table entry begins.

27. A storage medium as defined in claim 19 wherein the garbage collector interprets at least one possible value of the locator information in a given card-object-table entry as indicating that a multiple-card-object-table-entry sequence ahead of the given card-object-table entry is an indicator of the location of an object in which the card associated with the given card-object-table entry begins.

28. A computer program product comprising a computer readable medium having thereon sequences of instructions that, when executed by a computer system that includes memory, cause it to operate as a garbage collector that:
A) treats at least a portion of a garbage-collected heap in the memory as divided into cards with which the garbage collector associates respective card-object-table entries;
B) maintains the card-object-table entries with values selected from a value range that includes:
  i) at least one of a set of card-object-table entry values, each of which the collector interprets as locator information representing the locations of references in the card with which that entry is associated; and
  ii) at least one of a set of card-object-table entry values, each of which the collector interprets as locator information representing the location within the card at which is located a predetermined field start of an object that begins somewhere between the ends of the card with which that entry is associated;
C) bases on those interpretations a determination of which locations in the cards contain references;
D) determines the reachability of objects from the contents of locations thereby determined to contain references; and
E) reclaims memory space occupied by objects thereby determined not to be potentially reachable.

29. A computer program product as defined in claim 28 wherein the collector interprets one value of a card-object-table entry, as indicating that the card contains no references.

30. A computer program product as defined in claim 28 wherein the collector interprets each value of a card-object-table entry associated with a given card, as representing the location at which is located a predetermined field of an object in which a predetermined location in the given card is located.

31. A computer program product as defined in claim 30 wherein the collector interprets each value of a card-object-table entry associated with a given card, as representing the location of the start of an object in which the given card starts.

32. A computer program product as defined in claim 28 wherein the collector:
F) determines whether a multiple-card-object-table-entry sequence that includes the card-object-table entry with which that card is associated satisfies a predetermined common-object criterion; and
G) if that multiple-card-object-entry sequence is thereby determined to satisfy the common-object criterion, interprets that multiple-card-object-entry sequence as an indicator of the location of an object in which the card begins.

33. A computer program product as defined in claim 28 wherein the collector interprets each value of a card-object-table entry associated with a given card, as representing the length of a sequence of references with which the given card begins.

34. A computer program product as defined in claim 28 wherein the collector interprets each value of a card-object-table entry associated with a given card, as representing the lengths of respective sequences of references and non-reference fields with which the given card begins.

35. A computer program product as defined in claim 28 wherein the garbage collector interprets each value in a set of possible values of the locator information in a given card-object-table entry as indicating that a card-object-table entry ahead of the given card-object-table entry is an indicator of the location of an object in which the card associated with the given card-object-table entry begins.

36. A computer program product as defined in claim 28 wherein the garbage collector interprets at least one possible value of the locator information in a given card-object-table entry as indicating that a multiple-card-object-table-entry sequence ahead of the given card-object-table entry is an indicator of the location of an object in which the card associated with the given card-object-table entry begins.

37. A garbage collector operating within the memory of a computer and comprising:
A) means for treating at least a portion of a garbage-collected heap in a computer system's memory as divided into cards with which the garbage collector associates respective card-object-table entries;
B) means for maintaining the card-object-table entries with values selected from a value range that includes:
  i) at least one of a set of card-object-table entry values, each of which the collector interprets as locator information representing the locations of references in the card with which that entry is associated; and
  ii) at least one of a set of card-object-table entry values, each of which the collector interprets as locator information representing the location within the card at which is located a start of an object that begins somewhere between the ends of the card with which that entry is associated;
C) means for basing on those interpretations a determination of which locations in the cards contain references;
D) means for determining the reachability of objects from the contents of locations thereby determined to contain references; and
E) means for reclaiming memory space occupied by objects thereby determined not to be reachable.

* * * * *

UNITED STATES PATENT AND TRADEMARK OFFICE
CERTIFICATE OF CORRECTION

PATENT NO. : 7,136,887 B2 Page 1 of 1
APPLICATION NO. : 10/309503
DATED : November 14, 2006
INVENTOR(S) : Alexander T. Garthwaite et al.

It is certified that error appears in the above-identified patent and that said Letters Patent is hereby corrected as shown below:

In the Claims:

In claim 28, column 29 (line 25), delete "predetermined field";
In claim 28, column 29 (line 34), delete "potentially".

Signed and Sealed this

Tenth Day of April, 2007

JON W. DUDAS
*Director of the United States Patent and Trademark Office*